United States Patent
Long

(10) Patent No.: US 11,995,280 B2
(45) Date of Patent: May 28, 2024

(54) TOUCH STRUCTURE, TOUCH DISPLAY PANEL AND ELECTRONIC APPARATUS

(71) Applicant: BOE Technology Group Co., Ltd., Beijing (CN)

(72) Inventor: Chunping Long, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 107 days.

(21) Appl. No.: 17/436,810

(22) PCT Filed: Jun. 8, 2021

(86) PCT No.: PCT/CN2021/098926
§ 371 (c)(1),
(2) Date: Sep. 7, 2021

(87) PCT Pub. No.: WO2022/057326
PCT Pub. Date: Mar. 24, 2022

(65) Prior Publication Data
US 2022/0334678 A1  Oct. 20, 2022

(30) Foreign Application Priority Data
Sep. 21, 2020 (CN) .......................... 202010991793.3

(51) Int. Cl.
G06F 3/044 (2006.01)
G06F 3/041 (2006.01)
G09G 3/3233 (2016.01)

(52) U.S. Cl.
CPC .......... G06F 3/0446 (2019.05); G06F 3/0412 (2013.01); *G06F 2203/04112* (2013.01);
(Continued)

(58) Field of Classification Search
CPC .... G06F 3/0412; G06F 3/0446; G06F 3/0443; G06F 2203/04112; G06F 2203/04111; G09G 2300/0426; G09G 2300/0842
(Continued)

(56) References Cited

U.S. PATENT DOCUMENTS 9,519,174 B2  12/2016  Kim et al.
10,121,832 B1  11/2018  Wu et al.
(Continued)

FOREIGN PATENT DOCUMENTS

CN  103777810 A  5/2014
CN  106354299 A  1/2017
(Continued)

OTHER PUBLICATIONS

Oct. 13, 2022—(EP) Extended European Search Report Appn 21743364.8.
(Continued)

*Primary Examiner* — Jimmy H Nguyen
(74) *Attorney, Agent, or Firm* — Banner & Witcoff, Ltd.

(57) ABSTRACT

A touch structure, a touch display panel and an electronic apparatus are provided. The touch structure includes a first touch electrode extended along a first direction and a second touch electrode extended along a second direction; the first touch electrode includes first electrode main body portions in a first conductive layer (201) and a first connection portion in a second conductive layer (202); the second touch electrode includes second electrode main body portions and a second connection portion in the first conductive layer; the first connection portion is overlapped with the second connection portion in a direction perpendicular to the first conductive layer; the first conductive layer includes first metal meshes formed by first metal lines. The touch structure also includes a dummy electrode in the second conduc-
(Continued)

tive layer. The dummy electrode is coupled with at least one of the first connection portion and the second connection portion.

31 Claims, 20 Drawing Sheets

(52) U.S. Cl.
CPC ... *G09G 3/3233* (2013.01); *G09G 2300/0426* (2013.01); *G09G 2300/0842* (2013.01)

(58) Field of Classification Search
USPC .......................................................... 345/174
See application file for complete search history.

(56) References Cited

U.S. PATENT DOCUMENTS

| | | | |
|---|---|---|---|
| 10,248,240 | B2 | 4/2019 | Wang et al. |
| 10,754,461 | B2 | 8/2020 | Pak et al. |
| 10,761,665 | B2 | 9/2020 | Park |
| 10,877,587 | B2 | 12/2020 | Lee et al. |
| 10,921,937 | B2 | 2/2021 | Chen |
| 11,249,608 | B2 | 2/2022 | Xu et al. |
| 2014/0184939 | A1 | 7/2014 | Lai et al. |
| 2015/0015532 | A1 | 1/2015 | Choung et al. |
| 2016/0085339 | A1 | 3/2016 | Yashiro et al. |
| 2016/0195983 | A1* | 7/2016 | Miyake ............... G06F 3/04166 345/174 |
| 2016/0202792 | A1 | 7/2016 | Han et al. |
| 2017/0212629 | A1 | 7/2017 | Cho et al. |
| 2018/0335865 | A1 | 11/2018 | Choi et al. |
| 2019/0004638 | A1 | 1/2019 | Lee et al. |
| 2019/0064960 | A1* | 2/2019 | Na ........................ G06F 3/0446 |
| 2019/0371865 | A1 | 12/2019 | Lee et al. |
| 2021/0048925 | A1 | 2/2021 | Wang et al. |
| 2021/0072865 | A1 | 3/2021 | He et al. |
| 2021/0382582 | A1 | 12/2021 | Wang et al. |

FOREIGN PATENT DOCUMENTS

| | | |
|---|---|---|
| CN | 107085476 A | 8/2017 |
| CN | 107765917 A | 3/2018 |
| CN | 108958531 A | 12/2018 |
| CN | 108984014 A | 12/2018 |
| CN | 108984034 A | 12/2018 |
| CN | 109273482 A | 1/2019 |
| CN | 110187788 A | 8/2019 |
| CN | 110471568 A | 11/2019 |
| CN | 110568963 A | 12/2019 |
| CN | 110874160 A | 3/2020 |
| CN | 111061392 A | 4/2020 |
| CN | 111475055 A | 7/2020 |
| CN | 111651093 A | 9/2020 |
| CN | 111831172 A | 10/2020 |
| JP | 6324656 B2 | 5/2018 |
| KR | 20140057890 A | 5/2014 |
| KR | 20170089467 A | 8/2017 |
| KR | 20190108870 A | 9/2019 |

OTHER PUBLICATIONS

Nov. 4, 2020—(CN) First Office Action Appn 202010991793.3 with English Translation.
Nov. 25, 2020—(CN) Second Office Action Appn 202010991793.3 with English Translation.

* cited by examiner

TOUCH STRUCTURE, TOUCH DISPLAY PANEL AND ELECTRONIC APPARATUS

The application is a U.S. National Phase Entry of International Application PCT/CN2021/098926 filed on Jun. 8, 2021, designating the United States of America and claiming priority to Chinese Patent Application No. 202010991793.3 filed on Sep. 21, 2020. The present application claims priority to and the benefit of the above-identified applications and the above-identified applications are incorporated by reference herein in their entirety.

TECHNICAL FIELD

Embodiments of the present disclosure relate to a touch structure, a touch display panel and an electronic apparatus.

BACKGROUND

In recent years, in order to achieve the purpose of portability, humanized operation and the like, various electronic products use a touch panel as an input device for instead of conventional keyboard or mouse. In those electronic apparatus integrated with the touch panel as the input device, a touch display apparatus with both touch and display functions is one of modern high-profile products. Arrangement of a touch electrode structure for achieving the touch function is an important factor affecting user experience.

SUMMARY

At least one embodiment provides a touch structure comprising a first touch electrode and a second touch electrode. The first touch electrode extends along a first direction, the second touch electrode extends along a second direction, and the first direction is different from the second direction; the first touch electrode comprises a plurality of first electrode main body portions sequentially arranged along the first direction and a first connection portion for electrically connecting two adjacent first electrode main body portions, the plurality of first electrode main body portions are located in a first conductive layer, and the first connection portion is located in a second conductive layer different from the first conductive layer; the second touch electrode comprises a plurality of second electrode main body portions sequentially arranged along the second direction and a second connection portion for electrically connecting two adjacent second electrode main body portions, and the plurality of second electrode main body portions and the second connection portion are located in the first conductive layer; the first conductive layer and the second conductive layer are insulated through an insulating layer; and the first connection portion and the second connection portion overlap in a direction perpendicular to the first conductive layer; the first conductive layer includes a plurality of first metal meshes formed by a plurality of first metal lines; each of the plurality of first electrode main body portions, each of the plurality of second electrode main body portions and the second connection portion comprise a plurality of first metal meshes, respectively; the second conductive layer comprises a plurality of second metal lines; the touch structure further comprises a dummy electrode located in the second conductive layer, and the dummy electrode is insulated from both the first touch electrode and the second touch electrode; and the dummy electrode is configured to be coupled with at least one selected from the group consisting of the first connection portion and the second connection portion.

In some embodiments, an area of the dummy electrode is S1; and an area of a mesh hole of any mesh defined by a projection of the dummy electrode on the first conductive layer and any one of the plurality of first metal lines in the first conductive layer is S2, and the following relationship is met:

$$a < \frac{S1}{S2} < b,$$

where 0.05<a<0.2; 0.1<b<0.3; and a<b.

In some embodiments, an extension direction of at least one first metal line is identical with an extension direction of the dummy electrode, and the dummy electrode overlaps with the at least one first metal line in the direction perpendicular to the first conductive layer.

In some embodiments, the dummy electrode is in a rectangle shape, and a length and a width of the dummy electrode are $X_D$ and $Y_D$, respectively; and the mesh hole of the any mesh is in a rectangle shape, a length and a width of the mesh hole are X and Y, respectively, and the following relationship is met:

$$a < \frac{X_D \times Y_D}{X \times Y} < b,$$

where 0.05<a<0.2; 0.1<b<0.3; and a<b.

In some embodiments, the dummy electrode comprises n rectangles connected with each other, lengths of the n rectangles are X1, X2 ... Xn, respectively, and widths of the n rectangles are all YD; n is an integer greater than 1; the mesh hole of the any mesh is in a rectangle shape, the length and the width of the mesh hole are X and Y, respectively, and the following relationship is met:

$$a < \frac{X_D \times Y_D}{X \times Y} < b,$$

where $X_D$=X1+X2+ ... +Xn; 0.05<a<0.2; 0.1<b<0.3; and a<b.

In some embodiments, the dummy electrode and the first connection portion comprise at least one second metal line, respectively, and the first connection portion comprises at least one first connection line; and each first connection line comprises at least one second metal line, and the first connection line is electrically connected with the two adjacent first electrode main body portions through a via hole in the insulating layer.

In some embodiments, each first connection line overlaps with a first metal line, with a same extension direction as the first connection line, in the second connection portion in the direction perpendicular to the first conductive layer, respectively.

In some embodiments, the first connection portion comprises a plurality of first connection lines, and the dummy electrode is located between any two of the plurality of first connection lines.

In some embodiments, an orthographic projection of the dummy electrode on the first conductive layer is at least partially overlap with the second connection portion.

In some embodiments, each of at least one second metal line in the dummy electrode overlaps with a first metal line, with a same extension direction as the second metal line, in the second connection portion in the direction perpendicular to the first conductive layer, respectively.

In some embodiments, a first metal line overlapping with the dummy electrode in the second connection portion is insulated from a first metal line in an adjacent first electrode main body portion through a gap, and the dummy electrode further covers the gap and overlaps with the first metal line in the adjacent first electrode main body portion in the direction perpendicular to the first conductive layer.

In some embodiments, the touch structure comprises a plurality of dummy electrodes, the first connection portion comprises a plurality of first connection lines extending along the first direction; and the plurality of dummy electrodes and the plurality of first connection lines are alternately arranged in the second direction.

In some embodiments, the dummy electrode includes a plurality of second metal lines connected with each other; the plurality of second metal lines are located on a same straight line; and the plurality of second metal lines extend along a third direction, respectively, the dummy electrode further comprises a branch portion extending from a joint of two adjacent second metal lines along a fourth direction, the branch portion overlaps with a first metal line extending along the fourth direction in the second connection portion in the direction perpendicular to the first conductive layer, and the fourth direction is different from the third direction.

In some embodiments, the dummy electrode comprises a plurality of second metal lines connected with each other; and two adjacent second metal lines in the plurality of second metal lines are located on different straight lines, respectively.

In some embodiments, the dummy electrode comprises a plurality of second metal lines connected with each other; each of the plurality of second metal lines corresponds to one first metal mesh in the second connection portion, respectively, and the second metal line overlaps with a first metal line, with a same extension direction as the second metal line, in the corresponding first metal mesh; an area of the dummy electrode is S1; and an area of a mesh hole of any first metal mesh corresponding to the plurality of second metal lines of the dummy electrode is S2, and the following relationship is met:

$$a < \frac{S1}{S2} < b,$$

where 0.05<a<0.2; 0.1<b<0.3; and a<b.

In some embodiments, the dummy electrode at least partially overlaps with at least one of the two adjacent first electrode main body portions in the direction perpendicular to the first conductive layer.

In some embodiments, the dummy electrode at least partially overlaps with at least one of the two adjacent second electrode main body portions in the direction perpendicular to the first conductive layer.

In some embodiments, the touch structure comprises a bendable region, the first connection portion comprises a bending portion located in the bendable region, the bending portion comprises at least one second metal line, the at least one second metal line is provided with a hole, and a hole diameter of the hole is 25% to 90% of a line width of the second metal line.

In some embodiments, the first connection portion comprises a polygon formed by connecting a plurality of second metal lines, at least part of the polygon is used as the bending portion, and the plurality of second metal lines overlap with the plurality of first metal lines in the direction perpendicular to the first conductive layer, respectively.

In some embodiments, the first connection portion further comprises a plurality of second metal meshes connected with a plurality of vertexes of the polygon, respectively, and the plurality of second metal meshes overlap with a plurality of first metal meshes in the second connection portion in the direction perpendicular to the first conductive layer; and a via hole is provided in the insulating layer corresponding to a vertex of each of the plurality of second metal meshes, and a second metal line in the second metal mesh is electrically connected with a first electrode main body portion adjacent to the first connection portion through the via hole.

At least one embodiment of the present disclosure also provides touch display panel, comprising: a base substrate, a display structure; and the touch structure described above, the display structure and the touch structure are stacked on the base substrate.

In some embodiments, the display structure comprises a pixel definition layer and a plurality of sub-pixels arranged in an array, each of the plurality of sub-pixels comprises a light emitting element and a pixel circuit for driving the light emitting element, the light emitting element comprises a first electrode, a light emitting layer and a second electrode, the light emitting layer is located between the first electrode and the second electrode, and the first electrode is located on one side of the second electrode close to the base substrate; the pixel definition layer comprises an opening for exposing the first electrode of the light emitting element so as to define a pixel opening region of the sub-pixel; and orthographic projections of the plurality of first metal lines and the plurality of second metal lines on the base substrate are all located outside orthographic projections of a plurality of pixel opening regions of the plurality of sub-pixels on the base substrate.

In some embodiments, an orthographic projection of a mesh hole of each of the plurality of first metal meshes on the base substrate covers orthographic projection of at least one pixel opening region on the base substrate.

In some embodiments, the pixel circuit comprises a storage capacitor, and the dummy electrode at least partially overlaps with at least one storage electrode of the storage capacitor.

In some embodiments, the first electrode of the light emitting element is electrically connected with the pixel circuit, and the dummy electrode, the first electrode of the light emitting element and the storage electrode overlap with each other in a direction perpendicular to the base substrate.

In some embodiments, the display structure further comprises a spacer disposed on one side of the pixel definition layer away from the base substrate, and the dummy electrode and the spacer at least partially overlap in a direction perpendicular to the base substrate.

In some embodiments, the dummy electrode is insulated from the first connection portion through a spacing on the second metal line, the spacing separates the second metal line into a first portion and a second portion, the first portion belongs to the dummy electrode, and the second portion belongs to the first connection portion; and an average length $X_D$ of the second metal line, an average width $Y_D$ of the second metal line, a size $X_{DGap}$ of the spacing and a space $S_{Gap}$ between adjacent pixel opening regions meet:

$$0 < \frac{Y_D}{S_{Gap}} < 0.2; 0.1 < \frac{X_{DGap}}{X} < 0.5.$$

In some embodiments, each of the plurality of first electrode main body portions is insulated from an adjacent second touch electrode through a spacing on the first metal line, the spacing separates the first metal line into a first portion and a second portion, the first portion belongs to the first electrode main body portion, and the second portion belongs to the second touch electrode; and an average length $X_D$ of the first metal line, an average width $Y_D$ of the first metal line, a size $X_{DGap}$ of the spacing and a space $S_{Gap}$ between adjacent pixel opening regions meet:

$$0 < \frac{Y_D}{S_{Gap}} < 0.2; 0.1 < \frac{X_{DGap}}{X} < 0.5.$$

In some embodiments, the plurality of sub-pixels include a first sub-pixel, the first sub-pixel is configured to emit light of a first-color; an area of an orthographic projection of the light emitting layer of the light emitting element of the first sub-pixel on the base substrate is S3; and an orthographic projection of a pixel opening region of the first sub-pixel on the base substrate is located within an orthographic projection of a mesh hole of one of the plurality of first metal meshes on the base substrate, and an area of the mesh hole of the one first metal mesh is S4.

In some embodiments, when the first sub-pixel is a green sub-pixel or a red sub-pixel, $$0 < \frac{s4}{s3} < 0.8;$$

and when the first sub-pixel is a blue sub-pixel, $$0.9 < \frac{S4}{S3} < 1.$$

In some embodiments, the orthographic projection of the light emitting layer of the light emitting element of the first sub-pixel on the base substrate is in a rectangle shape with a length $X_{FMM}$ and a width $Y_{FMM}$; the mesh of the one first metal mesh hole has a length X and a width Y; when the first sub-pixel is a green sub-pixel or a red sub-pixel, the following relationships are met:

$$0 < \frac{X}{X_{FMM}} < 0.9; \text{ and } 0 < \frac{X \times Y}{X_{FMM} \times Y_{FMM}} < 0.80;$$

and when the first sub-pixel is a blue sub-pixel, the following relationships are met:

$$0.95 < \frac{X}{X_{FMM}} < 1; \text{ and } 0.9 < \frac{X \times Y}{X_{FMM} \times Y_{FMM}} < 1.$$

In some embodiments, the first electrode of the light emitting element comprises a main body portion and an extension portion, the main body portion overlaps with the pixel opening region of the sub-pixel to which the light emitting element belongs in a direction perpendicular to the base substrate, the extension portion does not overlap with the pixel opening region of the sub-pixel in the direction perpendicular to the base substrate, and the extension portion is electrically connected with the pixel circuit of the sub-pixel.

In some embodiments, the plurality of sub-pixels include a first sub-pixel, a second sub-pixel and a third sub-pixel, and the first sub-pixel, the second sub-pixel and the third sub-pixel are configured to emit different colors of light; and areas of pixel opening regions of the first sub-pixel, the second sub-pixel and the third sub-pixel are sequentially reduced.

In some embodiments, an extension portion of a first electrode of a light emitting element of the first sub-pixel overlaps with the first conductive layer in the direction perpendicular to the base substrate, and has a first overlapping area; an extension portion of a first electrode of a light emitting element of the second sub-pixel overlaps with the first conductive layer in the direction perpendicular to the base substrate, and has a second overlapping area; an extension portion of a first electrode of a light emitting element of the third sub-pixel overlaps with the first conductive layer in the direction perpendicular to the base substrate, and has a third overlapping area; and the third overlapping area is greater than at least one of the first overlapping area and the second overlapping area.

At least one embodiment of the present disclosure also provides an electronic apparatus, comprising the touch structure described above or the touch display panel described above.

BRIEF DESCRIPTION OF THE DRAWINGS

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

DETAILED DESCRIPTION

Figure 1A:
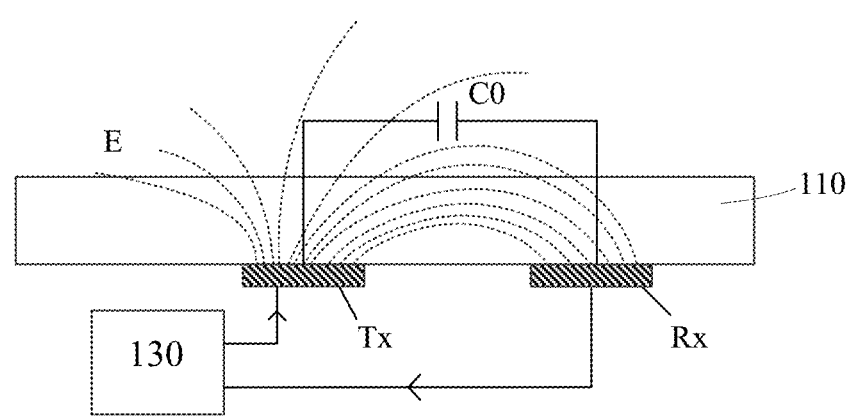
FIG. 1A and FIG. 1B show schematic diagrams of a mutual capacitive touch structure.

The technical solutions in the embodiments of the present disclosure will be described clearly and completely with reference to the non-limiting exemplary embodiments shown in the drawings and detailed in the following description, and the exemplary embodiments of this disclosure and their various features and advantageous details will be more fully explained. It should be noted that the features shown in the figures are not necessarily drawn to scale. The present disclosure omits descriptions of known materials, components, and process techniques so as not to obscure example embodiments of the disclosure. The examples given are only intended to facilitate understanding of the implementation of the exemplary embodiments of the present disclosure and further enable those skilled in the art to implement the exemplary embodiments. Therefore, these examples should not be understood as limiting the scope of the embodiments of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. "On," "under," "right," "left" and the like are only used to indicate relative position relationship, and when the position of the object which is described is changed, the relative position relationship may be changed accordingly.

An Organic Light Emitting Diode (OLED) display panel has the characteristics of light self-illumination, high contrast, low energy consumption, wide viewing angle, high response speed, application to a flexible panel, wide use temperature range, simplicity for manufacturing and the like, and has a broad development prospect. In order to meet diversified demands of users, it is of great significance to integrate various functions in the display panel, such as touch function, fingerprint recognition function and the like. For example, there is an implementation mode of forming an on-cell touch structure in the OLED display panel, and the mode achieves the touch function of the display panel by forming the touch structure on a packaging film of the OLED display panel.

For example, a mutual capacitive touch structure includes a plurality of touch electrodes, the plurality of touch electrodes include touch driving electrodes and touch sensing electrodes extending in different directions, and the touch driving electrodes $T_X$ and the touch sensing electrodes $R_X$ form mutual capacitances for touch sensing at intersections. The touch driving electrode $T_X$ is used for inputting an excitation signal (a touch driving signal), and the touch sensing electrode $R_X$ is used for outputting a touch sensing signal. By inputting the excitation signal to, for example, a longitudinally extending touch driving electrode, and receiving the touch sensing signal from, for example, a transversely extending touch sensing electrode, so that a detecting signal reflecting a capacitance value of a coupling point (e.g., the intersection) between the transverse and longitudinal electrodes can be obtained. When a finger touches a touch screen (e.g., cover plate glass), coupling between the touch driving electrode and the touch sensing electrode near a touch point is influenced, so that the capacity of the mutual capacitance at the intersection between the two electrodes is changed, resulting in the change of the touch sensing signal. Coordinates of the touch point can be calculated according to data of the two-dimensional capacitance change amount of the touch screen based on the touch sensing signal.

Figure 1B:
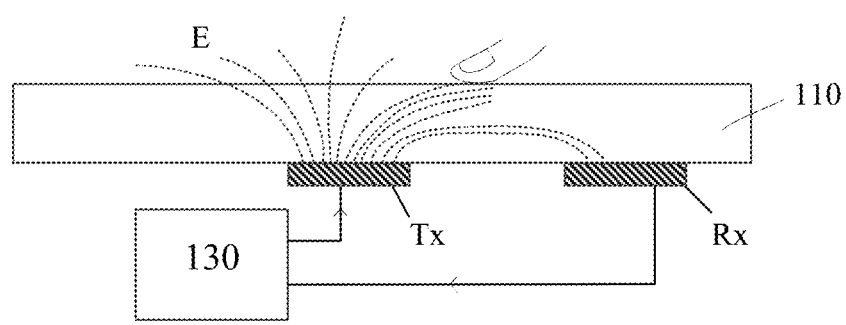

FIG. 1A and FIG. 1B show schematic diagrams of a mutual capacitive touch structure. As shown in FIG. 1A and FIG. 1B, under the drive of a touch driving circuit 130, a touch driving signal is applied to a touch driving electrodes $T_X$ so as to generate electric field lines E, and the electric field lines E are received by the touch sensing electrode $R_X$ to form a reference capacitance C0. When a finger touches a touch screen 110, due to the fact that the human body is a conductor, a part of electric field lines E generated by the touch driving electrode $T_X$ are guided to the finger to form a finger capacitance, which reduces the electric field lines E received by the touch sensing electrode $R_X$, so that a capacitance value between the touch driving electrode $T_X$ and the touch sensing electrode $R_X$ is reduced. The touch driving circuit 130 acquires the above capacitance value by the touch sensing electrode $R_X$ and compares the capacitance value with the reference capacitance C0, so as to obtain a capacitance change amount ΔC. The coordinates of the touch point may be calculated according to the data of the capacitance change amount ΔC and the position coordinates of each touch capacitance.

In some touch display apparatus, the touch electrode for touch sensing is formed by a transparent metal oxide material, such as Indium Tin Oxide (ITO), so as to prevent the touch electrode from influencing the display effect. However, indium is a rare metal, which is difficult to obtain and expensive, so it is not conducive to competition in the market. In addition, the indium tin oxide also has problems of liability to yellowing, liability to damage, inflexibility, high resistance value and the like. Therefore, in recent years, a metal mesh formed by conducting lines is developed to form the touch electrode. The metal mesh not only has low resistance, but also has excellent ductility and flexibility, and can improve the bending resistance and machinability of the touch electrode, and is suitable for flexible electronic application.

An inventor finds that a metal line of the metal mesh is lower in resistance, and more sensitive for the subtly changed capacitance. Therefore, when the touch driving electrode $T_X$ and the touch sensing electrode $R_X$ formed by the metal mesh form a capacitance at an intersection of the touch driving electrode $T_X$ and the touch sensing electrode $R_X$, an instantaneous current flowing through the capacitance is relatively large (due to low resistance loss of the metal line), and relatively speaking, the proportion of current change caused by the finger capacitance is relatively small, resulting in that the proportion of the capacitance change amount $\Delta C$ caused by finger touch with respect to the reference capacitance C0 is small, thereby influencing detection sensitivity and the detection effect of the touch structure.

Because the coupling capacitance between the touch driving electrode $T_X$ and the touch sensing electrode $R_X$ is mainly formed by the coupling of the two at the intersection, at least one embodiment of the present disclosure provides a touch structure. The touch structure is provided with a dummy electrode at or near an intersection of a touch driving electrode and a touch sensing electrode; the dummy electrode is configured to be coupled with the intersecting portion (i.e., a connection portion or a bridging portion) of the touch driving electrode $T_X$ and the touch sensing electrode $R_X$, so that electric field lines E reaching the touch sensing electrode $R_X$ from the touch driving electrode $T_X$ can be reduced; and for example, the dummy electrode can block or lead away part of the electric field lines generated by the touch driving electrode $T_X$, so as to reduce the electric field lines received by the touch sensing electrode $R_X$. Therefore, the reference capacitance C0 between the touch driving electrode $T_X$ and the touch sensing electrode $R_X$ can be reduced, and the proportion of the capacitance change amount $\Delta C$ caused by finger touch with respect to the reference capacitance C0 can be increased, thereby improving the detection sensitivity and the detection effect of the touch structure. For example, the dummy electrode overlaps with the bridging portion in a direction perpendicular to the touch driving electrode $T_X$ or the touch sensing electrode $R_X$, and the dummy electrode and the bridging portion are coupled with each other through longitudinal electric field lines; or, the dummy electrode does not overlap with the bridging portion in the direction perpendicular to the touch driving electrode $T_X$ or the touch sensing electrode $R_X$, and the dummy electrode and the bridging portion are coupled with each other through transverse electric field lines.

In addition, the dummy electrode and a first connection portion of the first touch electrode are arranged in an insulated mode on the same layer, and can be formed in the same patterning process without additional process.

Figure 2A:
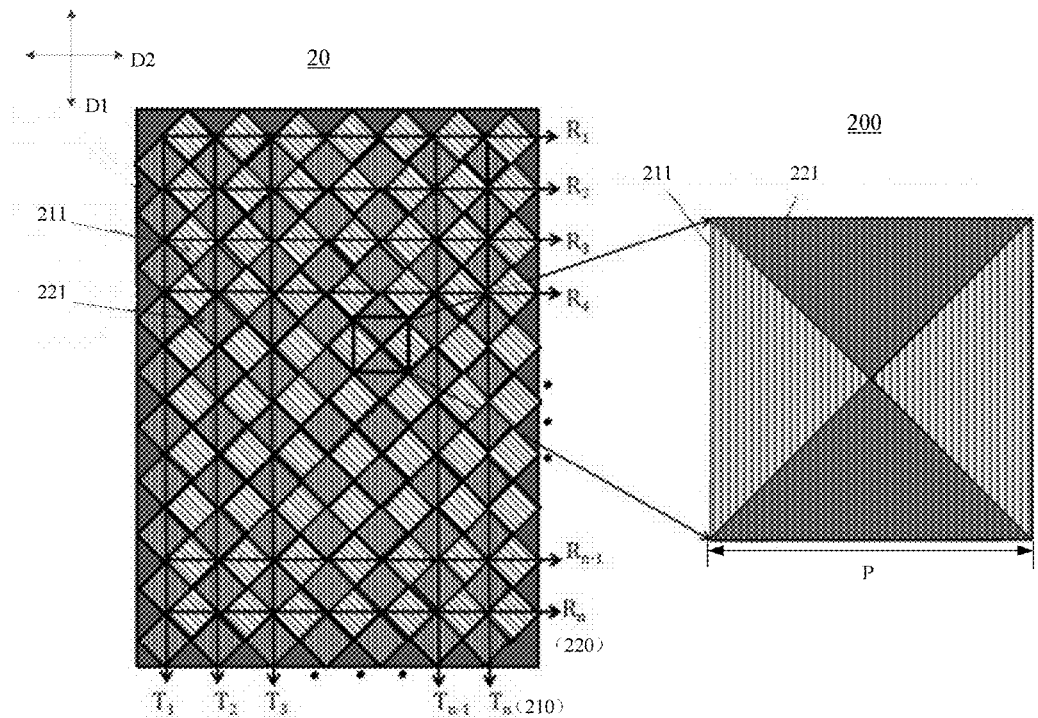
FIG. 2A is a schematic diagram 1 of a touch structure provided by at least one embodiment of the present disclosure.

FIG. 2A is a structural schematic diagram of a touch structure provided by at least one embodiment of the present disclosure. As shown in FIG. 2A, the touch electrode structure includes a plurality of first touch electrodes 210 (T1 to Tn) extending along a first direction D1 and a plurality of second touch electrodes 220 (R1 to Rn) extending along a second direction D2. For example, the first touch electrode 210 is a touch driving electrode so as to receive, for example, a touch driving signal from a driving circuit (e.g., a driving Integrated Circuit (IC)); and the second touch electrode 220 is a touch sensing electrode so as to transmit, for example, a touch sensing signal back to the driving circuit. However, the embodiments of the present disclosure do not make any limit to it. In other examples, the first touch electrode 210 may be the touch sensing electrode, while the second touch electrode 220 may be the touch driving electrode.

The first touch electrode 210 includes a plurality of first electrode main body portions 211 sequentially arranged along the first direction D1 and a first connection portion 212 for electrically connecting two adjacent first electrode main body portions 211, so that a plurality of first connection portions 212 sequentially connect a plurality of first electrode main body portions 211 in series along the first direction D1. The second touch electrode 220 includes a plurality of second electrode main body portions 221 sequentially arranged along the second direction D2 and a second connection portion 222 for electrically connecting two adjacent second electrode main body portions 221, so that a plurality of second connection portions 222 sequentially connect a plurality of second electrode main body portions 221 in series along the first direction D1. As shown in FIG. 2A, main body outlines of each first electrode main body portion 211 and each second electrode main body portion 221 are both in a rhombus shape. In other examples, the first electrode main body portion 211 and the second electrode main body portion 221 also may be in other shapes, e.g., a triangle shape, a rectangle shape, a strip shape and the like. For example, in the embodiments of the present disclosure, the first connection portion 212 and the second connection portion 222 may be portions or ranges where the first touch electrode 210 and the second touch electrode 220 overlap each other in the direction perpendicular to the base substrate or the conductive layer where the first touch electrode 210 is located.

Each first touch electrode 210 and each second touch electrode 220 are insulated and crossed with each other and a plurality of touch units 200 are formed at the intersections. The plurality of touch units 200, for example, are arranged in an array in a detecting region, so that positioning can be carried out by two coordinates; and each touch unit 200 includes one part of each of two first electrode main body portions 211 connected at an intersection and at least one part of each of two second electrode main body portions 221 connected at the intersection.

FIG. 2A shows an enlarged schematic diagram of one touch unit 200 on the right side. As shown in the figure, each touch unit 200 includes half regions of two first electrode main body portions 211 adjacent to each other and half regions of two second electrode main body portions 221 adjacent to each other, that is, each touch unit 200 averagely includes the region of one first electrode main body portion 211 and the region of one second electrode main body portion 221, and a joint of the first electrode main body portion 211 and the second electrode main body portion 221 in each touch unit 200 (i.e., the intersection of the first connection portion and the second connection portion) forms a reference point for calculating coordinates. When the finger touches the touch screen, the coupling between the first touch electrode and the second touch electrode near the touch point is influenced, so that the mutual capacity between the two electrodes is changed. The touch sensing signal generated by that process is changed according to the capacitance change amount $\Delta C$ of the touch screen, so that coordinates of each touch point can be calculated on the basis of the reference point. For example, the area of each touch unit 200 is equivalent to the area of the region where the finger of a person contacts the touch panel, if the area of the touch unit is excessively large, a touch blind point on the panel may occur, and if the area of the touch unit is excessively small, a false touch signal may occur.

Figure 3A:
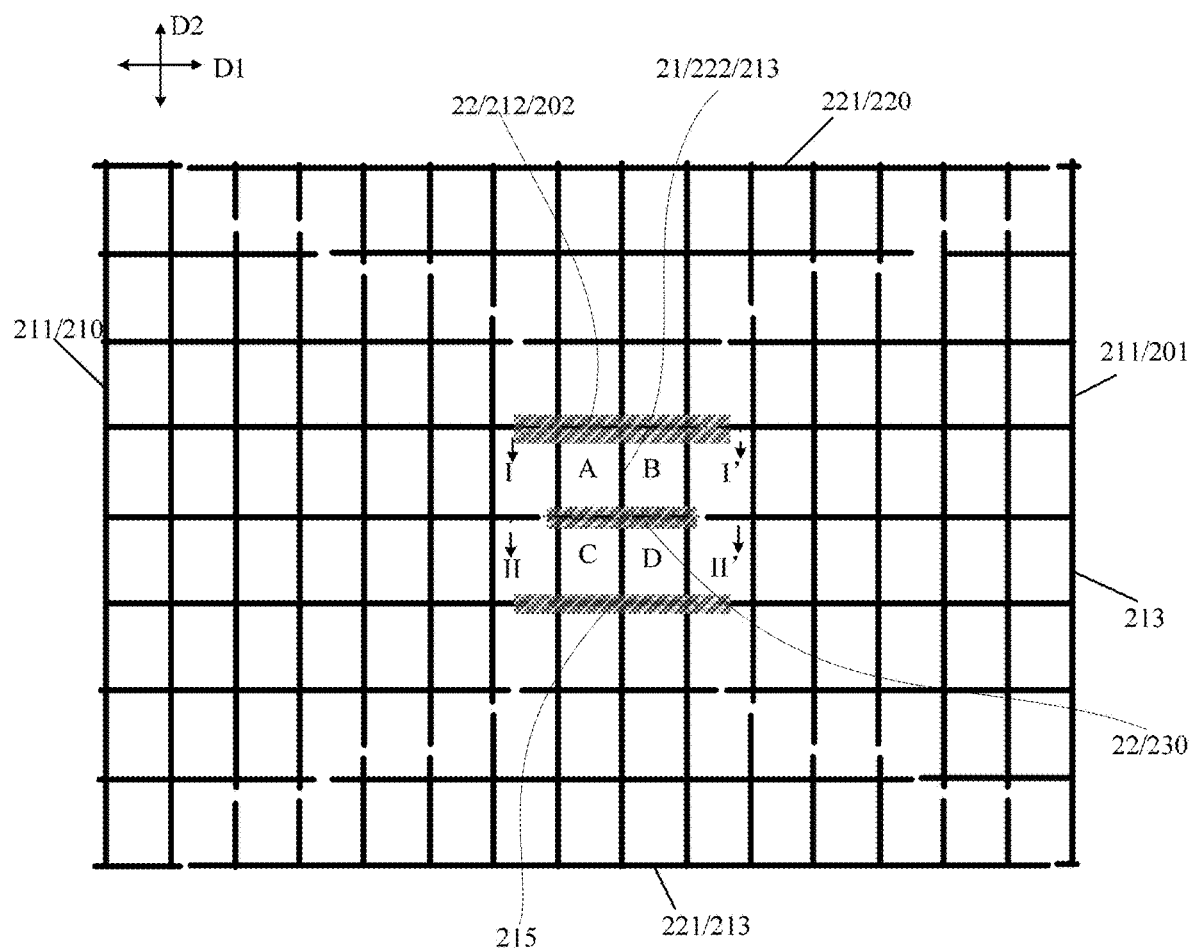
FIG. 3A-FIG. 3C are schematic diagrams 2 of a touch structure provided by at least one embodiment of the present disclosure.
Figure 3B:
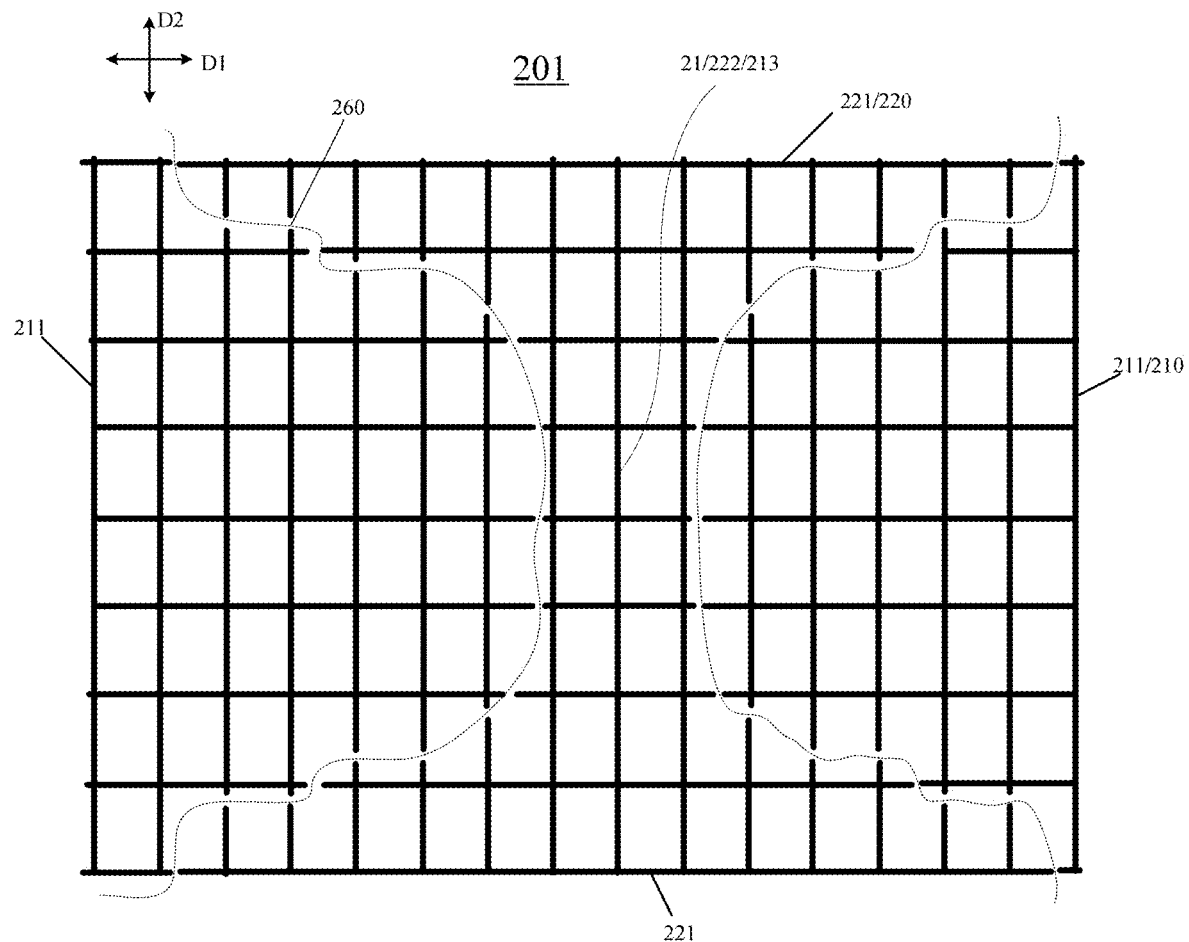
Figure 3C:
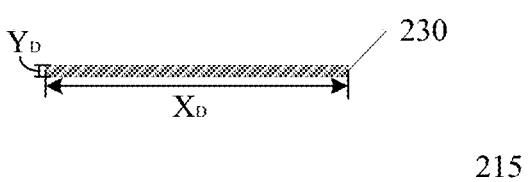

An average side length of each touch unit 200 is P, which is called as a pitch of the touch structure. For example, the size range of the pitch P is 3.7 mm to 5 mm, and for example, is about 4 mm; and this is because the average diameter of ordinary people's fingers in contact with the touch panel is about 4 mm. For example, the size of the pitch is the same as an average side length of each first electrode main body portion 211 and an average side length of each second electrode main body portion 221, and is also the same as a center distance between two adjacent first electrode main body portions 211 and a center distance between two adjacent second electrode main body portions 221. FIG. 3A shows an enlarged schematic diagram of the touch structure at the intersection of the first touch electrode and the second touch electrode, FIG. 3B shows a first conductive layer 201, and FIG. 3C shows a second conductive layer 202. The first conductive layer 201 includes a plurality of first metal meshes 213 formed by a plurality of first metal lines 21; and each of the plurality of first electrode main body portions 211, each of the plurality of second electrode main body portions 221 and the second connection portion 222 include a plurality of first metal meshes 213, respectively. The second conductive layer 202 includes a plurality of second metal lines 22. For clarity, the second metal line in the second conductive layer is shown with a wide line in FIG. 3A; however, it is not intended to limit the present disclosure, and an average line width of the second metal line can be greater than, smaller than or equal to that of the first metal line. Each embodiment below is the same with it, which will not be repeated herein.

A gap between the first electrode main body portion 211 and the second touch electrode 220 is shown with dotted lines in FIG. 3B, and the embodiments below are the same with it, which will not be repeated herein. The first metal line in the first electrode main body portion 211 and the first metal line in the second touch electrode 220 are insulated from each other through a spacing 260 on the first metal line, the spacing separates the first metal line 260 where the spacing is positioned into two portions insulated from each other, and the two portions belong to the first electrode main body portion 211 and the second touch electrode 220, respectively.

With reference to FIG. 3A to FIG. 3C, the plurality of first electrode main body portions 211, the plurality of second electrode main body portions 221 and the second connection portion 222 are located in the first conductive layer 201, and the first connection portion 212 is located in the second conductive layer 202. The first conductive layer 201 and the second conductive layer 202 are spaced through an insulating layer 203, and the first connection portion 212 is electrically connected with the adjacent first electrode main body portion 211 through a via hole 240 in the insulating layer 203.

For example, the first conductive layer 201, the insulating layer 203 and the second conductive layer 202 are sequentially arranged on a substrate 30. For example, the substrate 30 may be a flexible substrate or a rigid substrate. For example, the substrate 30 may be a display panel, or a plane structure included in the display panel, for example, a substrate on a display side, other structures, circuits or functional modules also can be formed on the substrate, and the embodiments of the present disclosure are not limited to this. The substrate 30 provides a base for forming the touch structure 20, and the embodiments of the present disclosure do not make any limit to a specific structure of the substrate.

Figure 4A:
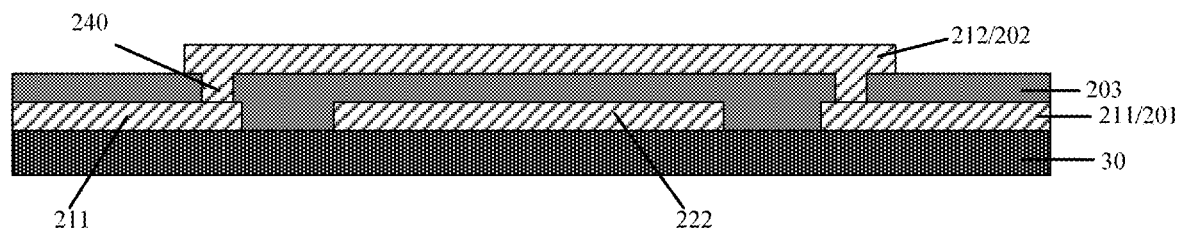
FIG. 4A-FIG. 4C are section views of a touch structure provided by at least one embodiment of the present disclosure.
Figure 4B:
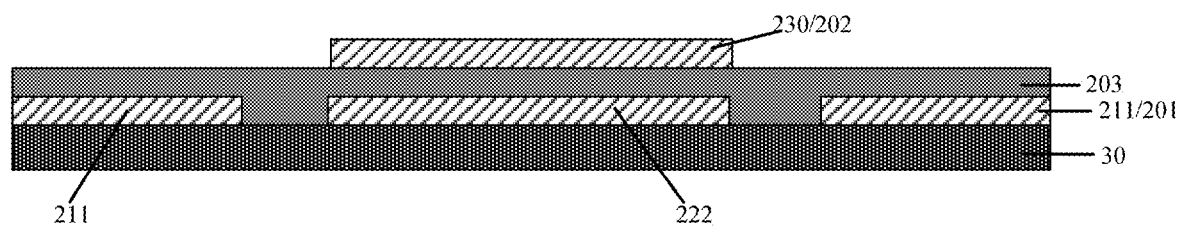

FIG. 4A is a section view of FIG. 3A along a section line I-I', and FIG. 4B is a section view of FIG. 3A along a section line II-II'. As shown in FIG. 4A to FIG. 4B, the first conductive layer 201 is closer to the substrate 30 than the second conductive layer 202. Since the first conductive layer 201 includes most of the structures in the touch structure 20, when the first conductive layer 201 is provided closer to the substrate 30, influence of the pattern in the second conductive layer 202 on flatness of the first conductive layer 201 can be avoided, and quality of the electrode structure in the first conductive layer 201 can be improved. In some other examples, the second conductive layer 202 also can be provided closer to the substrate 30, and the embodiments of the present disclosure do not make any limit to it.

With reference to FIG. 3A and FIG. 4A, the first connection portion 212 and the second connection portion 222 overlap in a direction perpendicular to the first conductive layer 201 so as to form the reference capacitance C0 for touch detection.

The metal mesh 213, for example, is in a rectangle shape, and two sides of the rectangle extend along a third direction and a fourth direction, respectively; and the third direction and the fourth direction may be the same with the first direction D1 and the second direction D2, respectively, or may be different from both the first direction D1 and the second direction D2. The present disclosure does not make any limit to it. Illustration will be made below by taking a case that the third direction and the fourth direction are the same with the first direction D1 and the second direction D2 as an example.

With reference to FIG. 3A and FIG. 4B, the touch structure 20 further includes a dummy electrode 230 located in the second conductive layer 202, and the dummy electrode 230 is located between two adjacent first electrode main body portions 211, and is insulated from both the first touch electrode 210 and the second touch electrode 220.

Figure 2B:
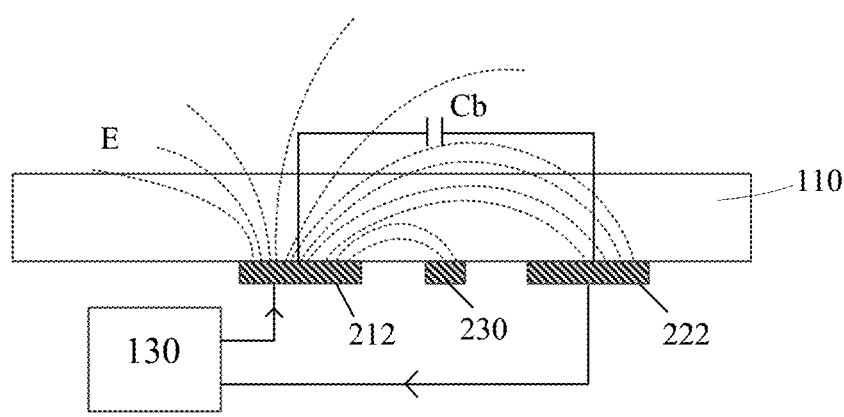
FIG. 2B shows a schematic diagram of a touch structure provided by an embodiment of the present disclosure.

FIG. 2B shows a schematic diagram of the touch structure provided by the embodiment of the present disclosure. As shown in FIG. 2B, by arranging the dummy electrode 230 at or near the intersection of the first touch electrode and the second touch electrode (e.g., between the first connection portion 212 and the second connection portion 222), a part of electric field lines emitted by the first connection portion 212 are received by the dummy electrode 230, so that the dummy electrode, for example, can be effectively coupled with the first connection portion 212, and the coupling capacitance Cb between the first connection portion 212 and the second connection portion 222 is reduced, thereby reducing the reference capacitance between the first touch electrode and the second touch electrode. The embodiments of the present disclosure do not make any limit to the specific position of the dummy electrode, and the dummy electrode may be positioned at the intersection of the first touch electrode and the second touch electrode, or may be positioned near the intersection, as long as the dummy electrode can be coupled with at least one of the first connection portion 212 and the second connection portion 222 so as to effectively reduce the coupling capacitance Cb between the first connection portion 212 and the second connection portion 222. For example, at or near the intersection of the first connection portion 212 and the second connection portion 222, the dummy electrode 230 may be located inside the first connection portion 211 and overlap with the second connection portion 222 in the direction perpendicular to the first conductive layer, or the dummy electrode 230 may be located outside the first connection portion (i.e., not overlap with the first connection portion), and for example, the dummy electrode 230 may overlap with at least one of two first main body portions 211 adjacent to the first connection portion 211 in the direction perpendicular to the first conductive layer, or may overlap with at least one of two second main body portions 222 adjacent to the first connection portion in the direction perpendicular to the first conductive layer. For example, when the dummy electrode 30 is located outside the first connection portion, it can be avoided that the metal lines at the position of the first connection portion can be prevented from being dense, thereby reducing the process difficulty.

The embodiments of the present disclosure do not make any limit to the specific position of the dummy electrode, as long as the dummy electrode can be coupled (e.g., coupled through an electric field) with at least one selected from the group consisting of the first connection portion and the second connection portion. This arrangement makes the position of the dummy electrode more flexible and convenient to arrange.

For example, an extension direction of at least one first metal line 231 is the same with that of the dummy electrode, and the dummy electrode overlaps with the at least one first metal line 231 in the direction perpendicular to the first conductive layer 201.

For example, the dummy electrode 230 includes one or more second metal lines 232, each second metal line 232 in the dummy electrode 230 overlaps with a first metal line 231, with an extension direction as the second metal line, in the direction perpendicular to the first conductive layer 201.

For example, the dummy electrode 230 and the first connection portion 212 include at least one second metal line 22, respectively, and an orthogonal projection of the dummy electrode 230 on the first conductive layer 201 at least partially overlaps with the second connection portion 222. With this arrangement, the dummy electrode 230 is located at or near the intersection of the first connection portion 212 and the second connection portion 222, so that the dummy electrode 230 can effectively reduce the coupling electric field or the coupling capacitance (i.e., the reference capacitance C0) between the first touch electrode 210 and the second touch electrode 220, and the detection sensitivity and the detection effect of the touch structure can be improved. For example, the dummy electrode 230 is a floating electrode, i.e., that is, no electrical signal is loaded.

For example, the first connection portion 212 may include a plurality of connection lines separated from each other, or include a polygon formed by connecting a plurality of connection lines connected with each other, as long as two first electrode main body portions adjacent in the first direction D1 can be electrically connected, and the embodiments of the present disclosure do not make any limit to the specific pattern of the first connection portion 212.

For example, as shown in FIG. 3A and FIG. 4A, the first connection portion 212 includes at least one first connection line 215 extending along the third direction, and the first connection line 215 includes at least one second metal line 22, and the first connection line is electrically connected with two adjacent first electrode main body portions 211 through the via hole 240 in the insulating layer 203. Illustration is made below by taking the third direction and the first direction D1 as examples, but it is not intended to limit the embodiments of the present disclosure. In some other examples, the third direction and the fourth direction below may be different from both the first direction D1 and the second direction D2. In some another examples, the dummy electrode and the first connection line may be of a broken line shape, respectively. The embodiments of the present disclosure do not make any limit to it.

For example, each second metal line 22 in the first connection portion 212 is overlaps with the first metal line 21, extending along the first direction D1 in the second connection portion 222, in the direction perpendicular to the first conductive layer 201. For example, when the substrate 30 is a display panel, this arrangement can reduce the shielding of the metal lines in the touch structure to the display light of the display panel, and increase an aperture ratio of the display panel.

It should be illustrated that in at least some embodiments of the present disclosure, the first metal line refers to a metal line connected between two adjacent vertexes of the first metal mesh, i.e., each first metal line corresponds to one side of the first metal mesh; and the second metal line refers to a metal line portion in the second conductive layer, overlapping with one side (i.e., a first metal line) of the first metal mesh in the direction perpendicular to the first conductive layer, that is, each second metal line corresponds to one first metal line. Each embodiment below is the same with it, which will not be repeated herein.

For example, the first metal mesh 213 is of a rectangle shape; in some other examples, the first metal mesh 213 also may be of other quadrangle (e.g., rhombus) shape or other polygon (e.g., pentagon, hexagon and the like) shape; and in some other embodiments, the first metal mesh 213 also may include broken lines or arc lines (e.g., be of a circle, semicircle or oval shape). The embodiments of the present disclosure do not make any limit to the shape of the first metal mesh 213, and the shape of the first metal mesh 213 can be designed according to actual demands. For example, when the touch structure 20 is applied to the touch display panel, the first metal mesh only needs to be matched with the shape of the pixel opening region of the corresponding sub-pixel. Similarly, the first metal line 21 and the second metal line 22 also may include broken lines or an arc or a random curve matched with the shape of the pixel opening region of the corresponding sub-pixel, and the embodiments of the present disclosure do not make any limit to it. The embodiments of the present disclosure will be illustrated below by taking a case that the first metal mesh is of a rectangle shape as an example, the first metal lines forming the first metal mesh extend along the third direction and the fourth direction, respectively, the third direction and the fourth direction may be the same with the first direction D1 and the second direction D2, respectively, or may be different from both the first direction D1 and the second direction D2, and the embodiments of the present disclosure do not make any limit to it.

For example, the dummy electrode 230 overlaps with the first metal line 21 extending in identical direction with the second connection portion 222 in the direction perpendicular to the first conductive layer 201. For example, the dummy electrode 230 includes a plurality of second metal lines 22 connected with each other, and the plurality of second metal lines 22 overlap with a plurality of first metal lines 21 in the second connection portion 222 in the direction perpendicular to the first conductive layer 201, respectively. As shown in FIG. 3A and FIG. 4B, each second metal line 22 corresponds to one first metal mesh 213 in the second connection portion 222, respectively, and the second metal line 22 overlaps with the first metal line with the same extension direction in the corresponding first metal mesh 213. For example, both the dummy electrode 230 and the first connection line extend along the first direction. In some other examples, the extension direction of the dummy electrode and the first connection line also can be adaptively changed with the change of the extension direction of the first metal line, so as to ensure that the second metal line overlaps with the first metal line as much as possible.

For example, the dummy electrode 230 is located between two first connection lines 215 in the first connection portion 212. However, the embodiments of the present disclosure do not make any limit to it; and in some other examples, the dummy electrode 230 also may be located outside the first connection portion 212.

Figure 4C:
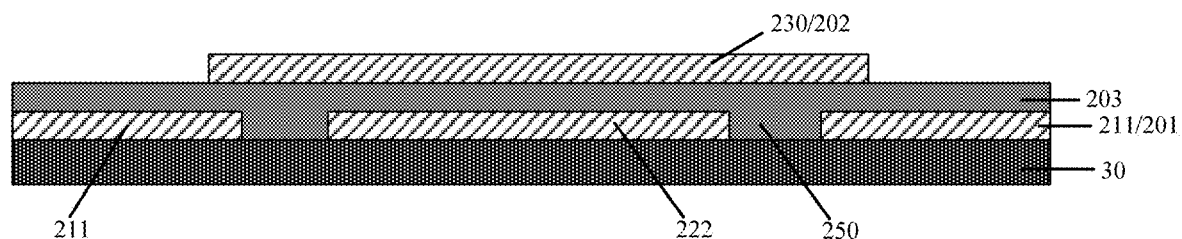

As shown in FIG. 3A and FIG. 4B, the first metal line 21 in the second connection portion 222 is insulated from the first metal line 21 in the adjacent first electrode main body portion 211 through a gap 250, and the dummy electrode 230 exposes at least part of the gap 250. In another example, as shown in FIG. 4C, the dummy electrode further covers the gap 250 and overlaps with the first metal line 21 in the adjacent first electrode main body portion 211 in the direction perpendicular to the first conductive layer 201.

For example, the touch structure 20 may include a plurality of dummy electrodes 230, the plurality of dummy electrodes 230 extend along the third direction, and the plurality of dummy electrodes 230 and a plurality of first connection lines 215 are alternately arranged in the fourth direction. For example, the distance between the dummy electrode 230 and the adjacent first connection line 215 corresponds to a side length of one first metal mesh 213. For example, the third direction is the same with the first direction D1, the fourth direction is the same with the second direction D2, but it is not intended to limit the embodiments of the present disclosure.

Figure 3D:
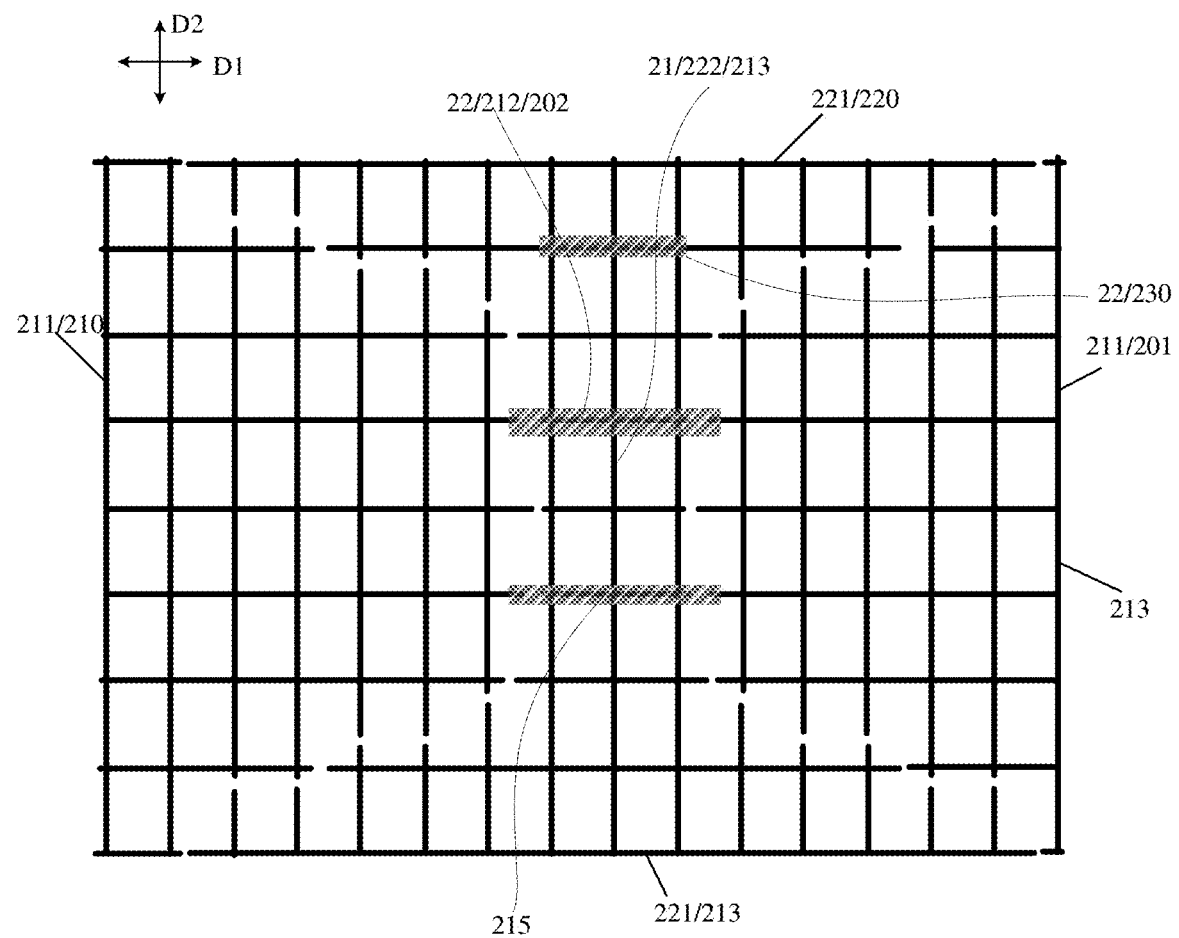
FIG. 3D to FIG. 3E are schematic diagrams of a touch structure provided by some other embodiments of the present disclosure.
Figure 3E:
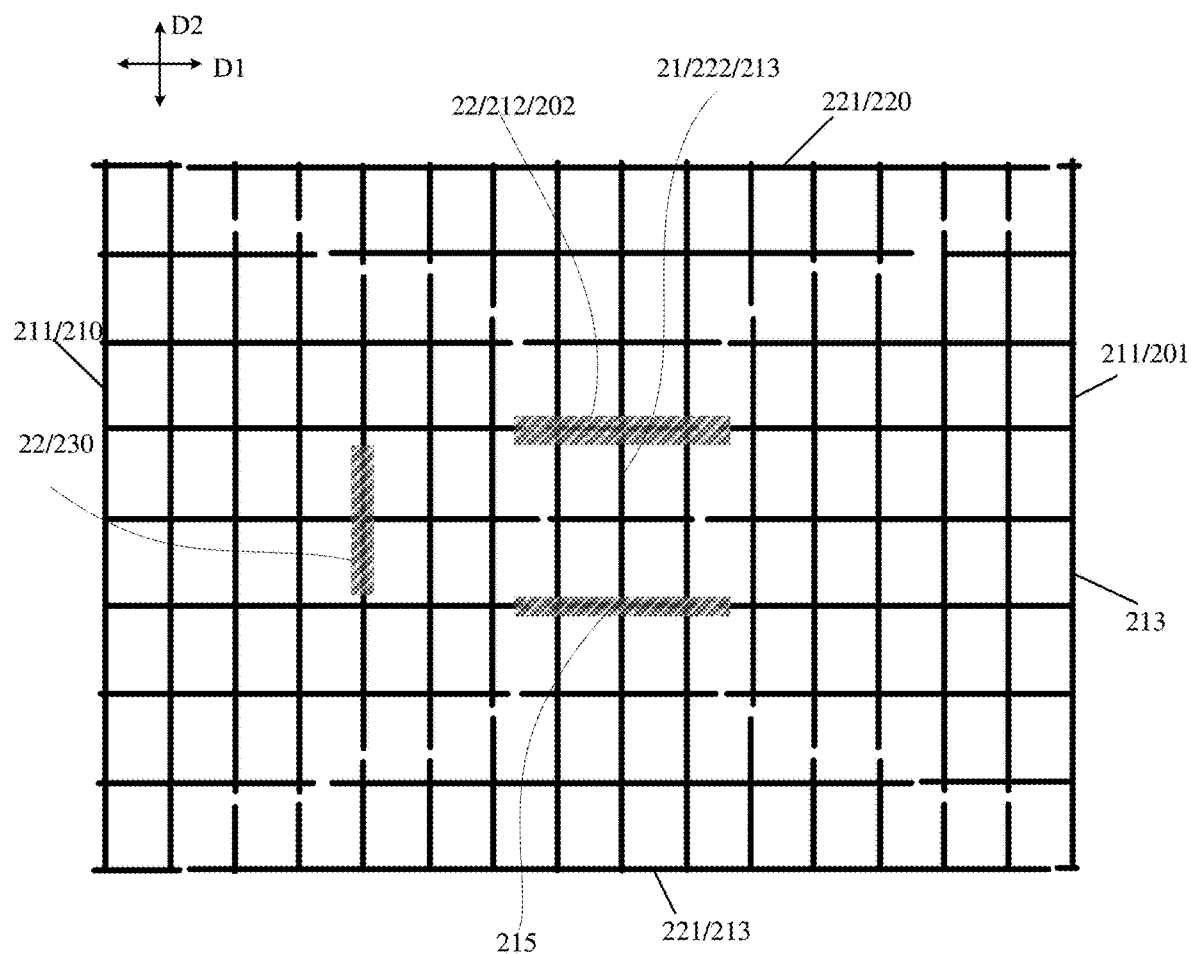

FIGS. 3D and 3E show schematic diagrams of a touch structure provided by some other embodiments of the present disclosure. As shown in FIG. 3D, the dummy electrode 230 at least partially overlaps with the second main body portion 221 in the direction perpendicular to the first conductive layer. For example, the dummy electrode overlaps with the first metal line with the same extension direction in the second main body portion. For example, the dummy electrode 230 extends along the first direction, and there are at most four rows of metal meshes between the orthographic projection of the dummy electrode 230 on the first conductive layer and the first metal line closest to the dummy electrode in the first connection portion, so as to ensure that the dummy electrode can be effectively coupled with the first connection portion and/or the second connection portion.

Figure 5:
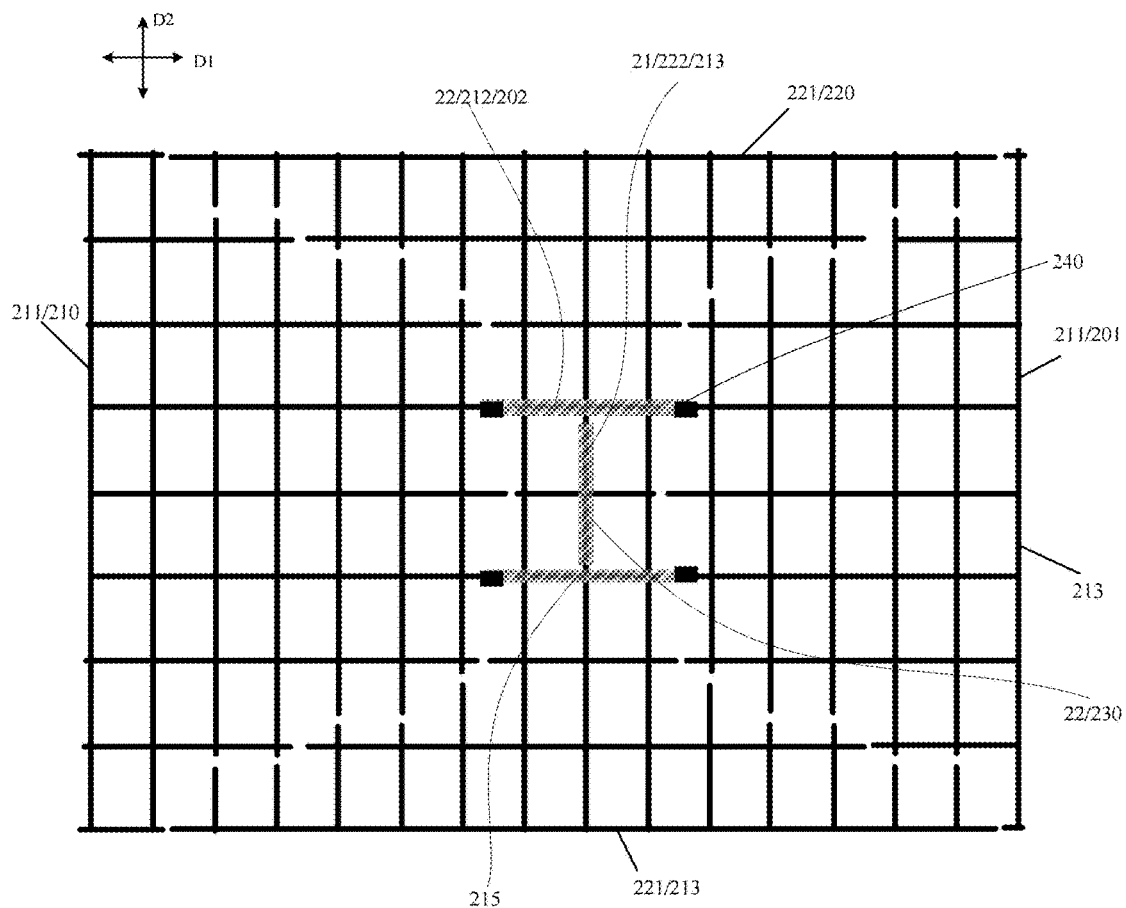
FIG. 5 is a schematic diagram 3 of a touch structure provided by at least one embodiment of the present disclosure.

As shown in FIG. 3E, the dummy electrode 230 at least partially overlaps with the first main body portion 211 in the direction perpendicular to the first conductive layer. For example, the dummy electrode overlaps with the first metal line with the same extension direction in the first main body portion. For example, the dummy electrode 230 extends along the second direction, and there are at most three columns of metal meshes between the orthographic projection of the dummy electrode 230 on the first conductive layer and the first metal line closest to the dummy electrode in the second connection portion, so as to ensure that the dummy electrode can be effectively coupled with the first connection portion and/or the second connection portion. In some other examples, as shown in FIG. 5, the dummy electrode 230 extends along the fourth direction, and the fourth direction is different from the third direction. For example, the third direction is the same with the first direction, the fourth direction is the same with the second direction, but it is not intended to limit the embodiments of the present disclosure. As shown in FIG. 5, the dummy electrode 230 overlaps with the first metal line 21 with the same extension direction in the second connection portion 222 in the direction perpendicular to the first conductive layer 203. For example, the dummy electrode may be located between the adjacent first connection lines 215, and spaced apart from the adjacent first connection lines 215 for insulation.

In some other examples, the dummy electrode 230 also may include the second metal line 22 extending along the first direction D1 and the second metal line 22 extending along the second direction D2 at the same time. For example, the second metal line 22 extending in the first direction D1 in the dummy electrode overlaps with the first metal line 21 extending in the first direction D1 in the second connection portion 222 in a direction perpendicular to the first conductive layer 201, and the second metal line 22 extending in the second direction D2 in the dummy electrode overlaps with the first metal line 21 extending in the second direction D2 in the second connection portion 222 in a direction perpendicular to the first conductive layer 201. This arrangement can increase the area of the dummy electrode in an active space so as to take a better shielding effect on the electric field lines between the first touch electrode 210 and the second touch electrode 220, and further reduce the reference capacitance C0, thereby improving the touch sensitivity. For example, the dummy electrode is of an L shape or a cross shape, and the embodiments of the present disclosure do not make any limit to it.

Figure 6:
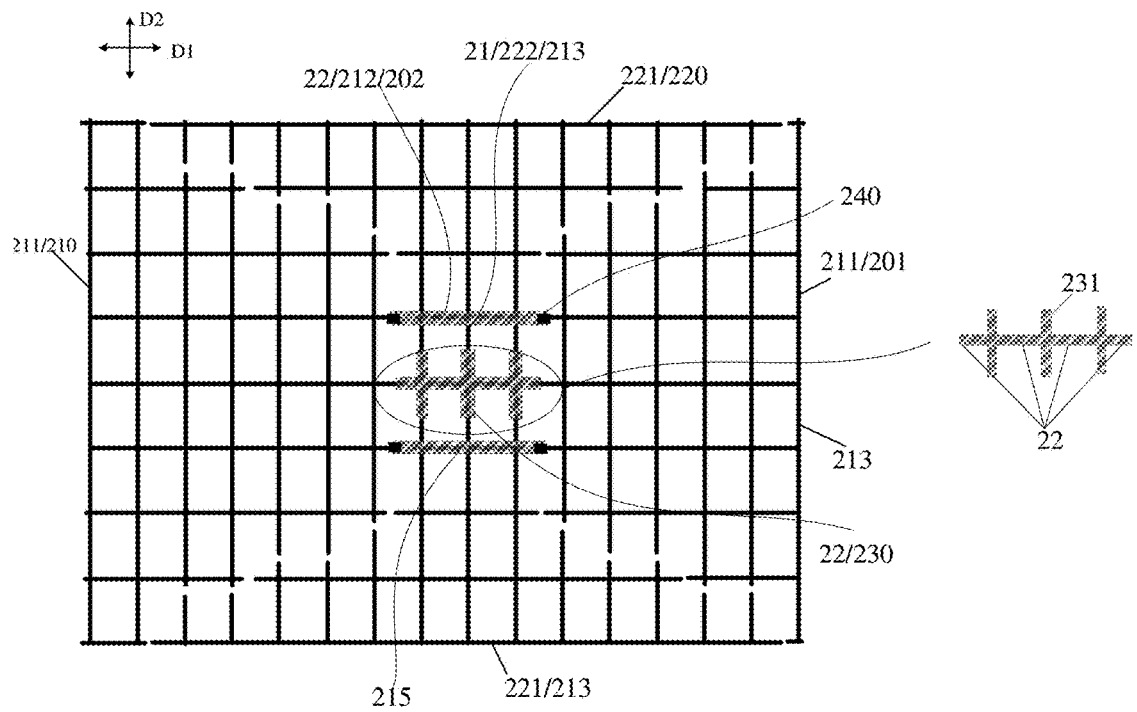
FIG. 6 is a schematic diagram 4 of a touch structure provided by at least one embodiment of the present disclosure.

FIG. 6 is a schematic diagram of a touch structure provided by some other embodiments of the present disclosure. As shown in FIG. 6, the dummy electrode 230 includes a plurality of second metal lines 22 connected with each other and extending along the first direction D1, each second metal line 22 corresponds to one first metal mesh 213 in the second connection portion 222, respectively, and the second metal line 22 overlaps with the first metal line 21 extending along the first direction D1 in the corresponding first metal mesh 213.

FIG. 6 shows an enlarged schematic diagram of the dummy electrode on the right side, and as shown in the figure, the plurality of second metal lines 22 extending in the first direction D1 in the dummy electrode 230 are located on the same straight line. The dummy electrode 230 further includes a branch portion 231 extending from a joint of two adjacent second metal lines 22 along the second direction D2, and the branch portion 231 overlaps with the first metal line 21 extending along the second direction D2 in the second connection portion 222 in the direction perpendicular to the first conductive layer 201. For example, in the direction perpendicular to the first conductive layer 201, each joint overlaps with the vertex of the first metal mesh, respectively. For example, in the second direction D2, a length of the branch portion 231 is smaller than the side length of the corresponding first metal mesh 213, so that the branch portion 231 is spaced and insulated from the first connection line 214.

This arrangement can increase the area of the dummy electrode in the active space, so as to play a better role in shielding the electric field lines between the first touch electrode 210 and the second touch electrode 220, and further reduce the reference capacitance C0, thereby improving the touch sensitivity.

For example, as shown in FIG. 6, the dummy electrode 230 extends in the first direction D1 to cover a gap between the adjacent first electrode main body portion 211 and second connection portion 222, and overlaps with the first metal line 21 in the first electrode main body portion 211.

Figure 7:
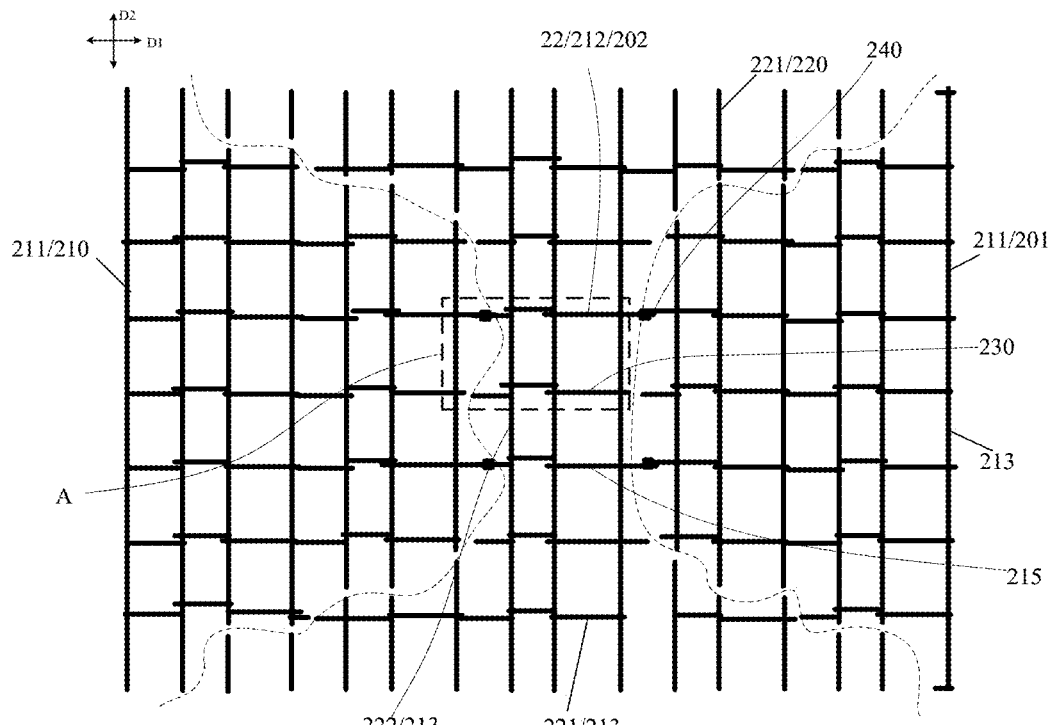
FIG. 7 is a schematic diagram 5 of a touch structure provided by at least one embodiment of the present disclosure.

FIG. 7 shows a schematic diagram of a touch structure provided by some other embodiments of the present disclosure. Different from the embodiments shown in FIG. 6, in the dummy electrode 230 shown in FIG. 6 two adjacent second metal lines 22 in a plurality of second metal lines 22 extending along the first direction D1 are not located on the same straight line, i.e., located on different straight lines, respectively. For example, the dummy electrode 230 is of a broken line shape. For example, a plurality of first metal meshes 213 connected in sequence in the first direction D1 corresponding to the dummy electrode 230 are different in size, and for example, the sizes in the second direction D2 are different, or arrangement of the plurality of first metal meshes 213 is misplaced, resulting in that the adjacent vertexes of the plurality of first metal meshes 213 are not converged to one point, and thus, an outline of the plurality of first metal meshes is of a broken line shape. Correspondingly, the dummy electrode 230 is also of a broken line shape so as to overlap with the outline of the plurality of first metal meshes in the direction perpendicular to the first conductive layer 203. For example, the first connection line 215 in the first connection portion 212 is also of a broken line shape.

For example, the area of the dummy electrode 230 is S1, an area of a mesh hole of any mesh defined by the projection of the dummy electrode 230 on the first conductive layer and the first metal line 21 in the first conductive layer is S2, and the following relationship is met:

$$a < \frac{S1}{S2} < b,$$

where $0.05<a<0.2$; $0.1<b<0.3$; and $a<b$. For example, $0.1<a<0.2$; $0.12<b<0.24$; and $a<b$.

The mesh herein is defined by the dummy electrode and the first metal line 21 in the first conductive layer, be the first metal line 21 overlapping with the dummy electrode may or may not exist in the first conductive layer, and the embodiments of the present disclosure do not make any limit to it. Namely, the mesh may be an actual mesh formed by connecting the first metal lines 21, or may be a virtual mesh defined by the projection of the dummy electrode on the first conductive layer and the first metal line in the first conductive layer, and the embodiments of the present disclosure do not make any limit to it.

For example, as shown in FIG. 3A and FIG. 3C, the dummy electrode 230 is of a rectangle shape, and a length and a width of the rectangle are $X_D$ and $Y_D$, respectively; and the area of the mesh hole of any mesh defined by the projection of the dummy electrode 230 on the first conductive layer and the first metal line in the first conductive layer is S2, and as shown in FIG. 3A, the projection of the dummy electrode 230 on the first conductive layer and the first metal line in the first conductive layer define four meshes A, B, C and D, and thus, S2 can represent the area of the mesh hole of any one of the four meshes. The mesh hole of the mesh is of a rectangle shape, a length and a width of the mesh are X and Y, respectively, and the following relationship is met:

$$a < \frac{X_D \times Y_D}{X \times Y} < b,$$

where $0.05<a<0.2$; $0.1<b<0.3$; and $a<b$. For example, $0.1<a<0.2$; $0.12<b<0.24$; and $a<b$.

In some other examples, the dummy electrode 230 includes n rectangles connected with each other, lengths of the n rectangles are X1, X2 ... Xn, respectively, and widths of the n rectangles are all $Y_D$; n is an integer greater than 1; the mesh hole of the mesh is of a rectangle shape, the length and the width of the mesh hole are X and Y, respectively, and the following relationship is met:

$$a < \frac{X_D \times Y_D}{X \times Y} < b,$$

where $X_D$=X1+X2+ ... +Xn; $0.05<a<0.2$; $0.1<b<0.3$; and $a<b$. For example, $0.1<a<0.2$; $0.12<b<0.24$; and $a<b$.

Figure 8A:
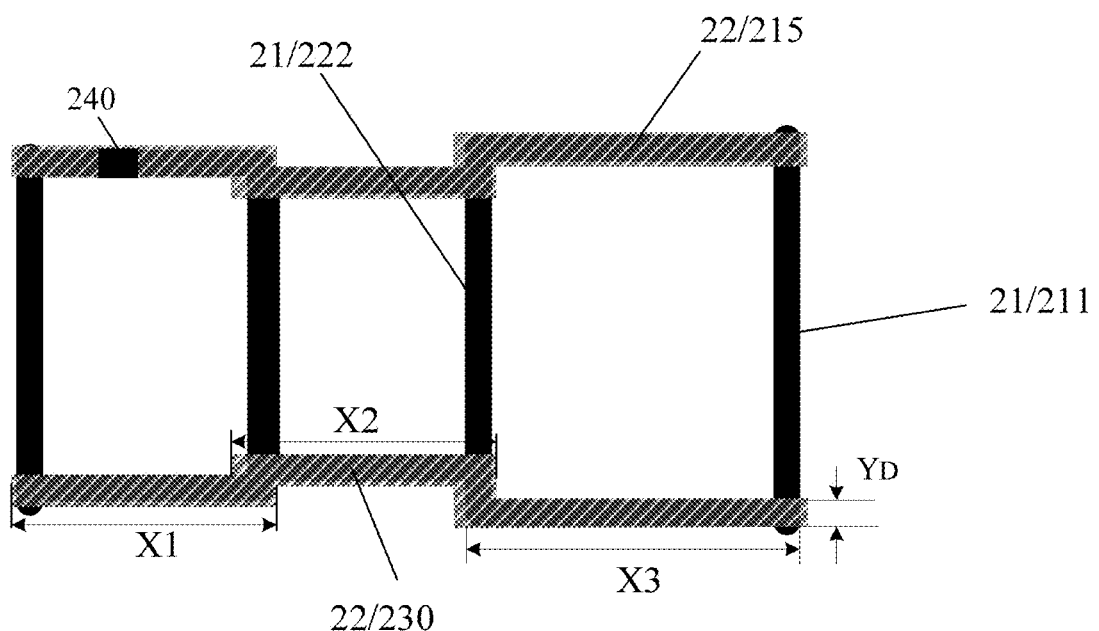
FIG. 8A-FIG. 8B are partially enlarged schematic diagrams of FIG. 7.

FIG. 8A shows an enlarged schematic diagram of a region A in FIG. 7. As shown in FIG. 7 and FIG. 8A, the dummy electrode 230 includes three second metal lines 22 connected with each other, the area of the dummy electrode 230 can be approximately equal to a total area of the three second metal lines 22, the lengths of the three second metal lines 22 are X1, X2 and X3, respectively, and the width of each second metal line 22 is $Y_D$. Herein, the second metal line 22 refers to a wire range in the second conductive layer, which is in parallel to and overlaps with one side of a first metal mesh, and the length range of each second metal line 22 corresponds to the first metal mesh; and the length of the second metal line refers to a size along the extension direction of the second metal line, while the width refers to a size along a direction orthogonal with the extension direction of the second metal line. A mesh hole of the first metal mesh 213 corresponding to each second metal line 22 is of a rectangle shape, and a length and a width of the rectangle are X and Y, respectively. Therefore, the S1=$X_D$*$Y_D$, and $X_D$=X1+X2+X3; S2=X*Y, and the following relationship is met:

$$a < \frac{X_D \times Y_D}{X \times Y} < b,$$

where $0.05<a<0.2$; $0.1<b<0.3$; for example, $0.1<a<0.2$, and $0.12<b<0.24$; and $a<b$.

For example, the area of the mesh hole of any first metal mesh corresponding to a plurality of second metal lines 22 in the dummy electrode 230 is S2, and the following relationship is met:

$$a < \frac{S1}{S2} < b,$$

where $0.05<a<0.2$; $0.1<b<0.3$; for example, $0.1<a<0.2$, and $0.12<b<0.24$; and $a<b$. Correspondence between the second metal line 22 and the first metal mesh 213 refers to a case that the second metal line 22 overlaps with the first metal line 22 parallel to the first metal line 22 in the first metal mesh 213 in the direction perpendicular to the first conductive layer 201. S1 herein refers to a total area of the dummy electrode 230, and S2 refers to an area of any one first metal mesh 213 overlapping with the dummy electrode 230 in the direction perpendicular to the first conductive layer 201. In this embodiment, there is the first metal line below the dummy electrode, the mesh defined by the dummy electrode and the first metal line in the first conductive layer can be regarded as the first metal mesh corresponding to the dummy electrode.

Figure 8B:
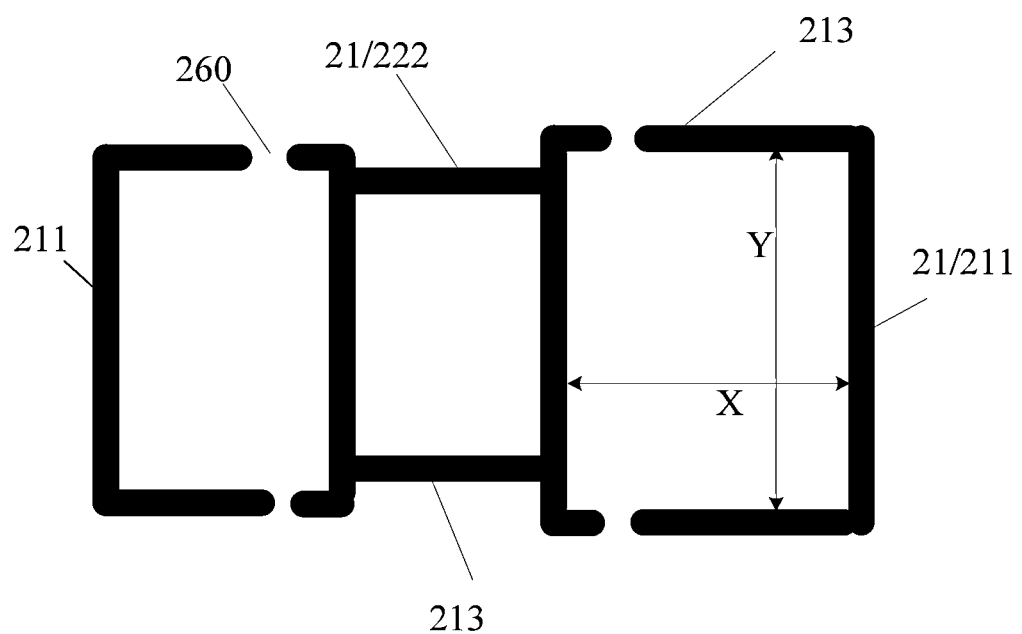

FIG. 8B shows a pattern of the first conductive layer in the region A. FIG. 8A to FIG. 8B show the adjacent first connection line 215 and dummy electrode 230 and the first metal mesh 213 positioned between them. The dummy electrode 230 includes three second metal lines 22, and an extending range corresponds to three adjacent first metal meshes 213 positioned on the same row. The three first metal meshes 213 are different from each other in size, and the vertexes of the adjacent metal meshes do not overlap. The three first metal meshes 213 include three portions insulated from each other and sequentially arranged in the first direction D1, the middle portion belongs to the second connection portion 222, and the portions on both sides belong to the first electrode main body portion 211 adjacent to and insulated from the second connection portion 222, respectively. The second connection portion 222 is spaced and insulated from the first electrode main body portion 211 through the spacing 260 in the first metal line 21. Herein, each second metal line 22 refers to the wire range in the second conductive layer parallel to and overlaps with one side of one first metal mesh, and the length range of the second metal line 22 corresponds to the first metal mesh.

As shown in FIGS. 8A to 8B, the dummy electrode 230 includes a plurality of rectangular structures connected with each other, the area of the dummy electrode 230 can be approximately equal to the total area of the three second metal lines 22, the lengths of the three second metal lines 22 are X1, X2 and X3, respectively, and the width of each second metal line 22 is $Y_D$. Herein, the second metal line 22 refers to the wire range in the second conductive layer, parallel to and overlaps with one side of one first metal mesh, and the length range of the second metal line 22 corresponds to the first metal mesh. The length of the second metal line refers to the size along the extension direction of the second metal line, while the width refers to the size along the direction orthogonal with the extension direction of the second metal line. The mesh hole of the first metal mesh 213 corresponding to each second metal line 22 is of a rectangle shape, and the length and the width of the rectangle are X and Y, respectively. Therefore, the $S1=X_D*Y_D$, and $X_D=X1+X2+X3$; $S2=X*Y$, and the following relationship is met:

$$a < \frac{X_D \times Y_D}{X \times Y} < b,$$

where 0.05<a<0.2; 0.1<b<0.3; for example, 0.1<a<0.2, and 0.12<b<0.24; and a<b.

The above is illustrated by taking a case that the first metal mesh is of a rectangle shape as an example, and when the first metal mesh is of other shapes, the area of the mesh hole of the first metal mesh can be correspondingly calculated and corresponding design is carried out so as to meet the relationship above.

It should be illustrated that the first metal mesh herein may be not a complete mesh, the first metal line on at least one side of the first metal mesh may have the spacing, and in this case, the area of the mesh hole of the first metal mesh refers to an area of a mesh hole of the complete mesh defined by each side of the first metal mesh.

When the touch structure is applied to a display apparatus, by the above-mentioned design, the sensitivity of touch detection can be improved while and the aperture ratio of the display apparatus can be improved, which will be described in detail below.

Figure 9:
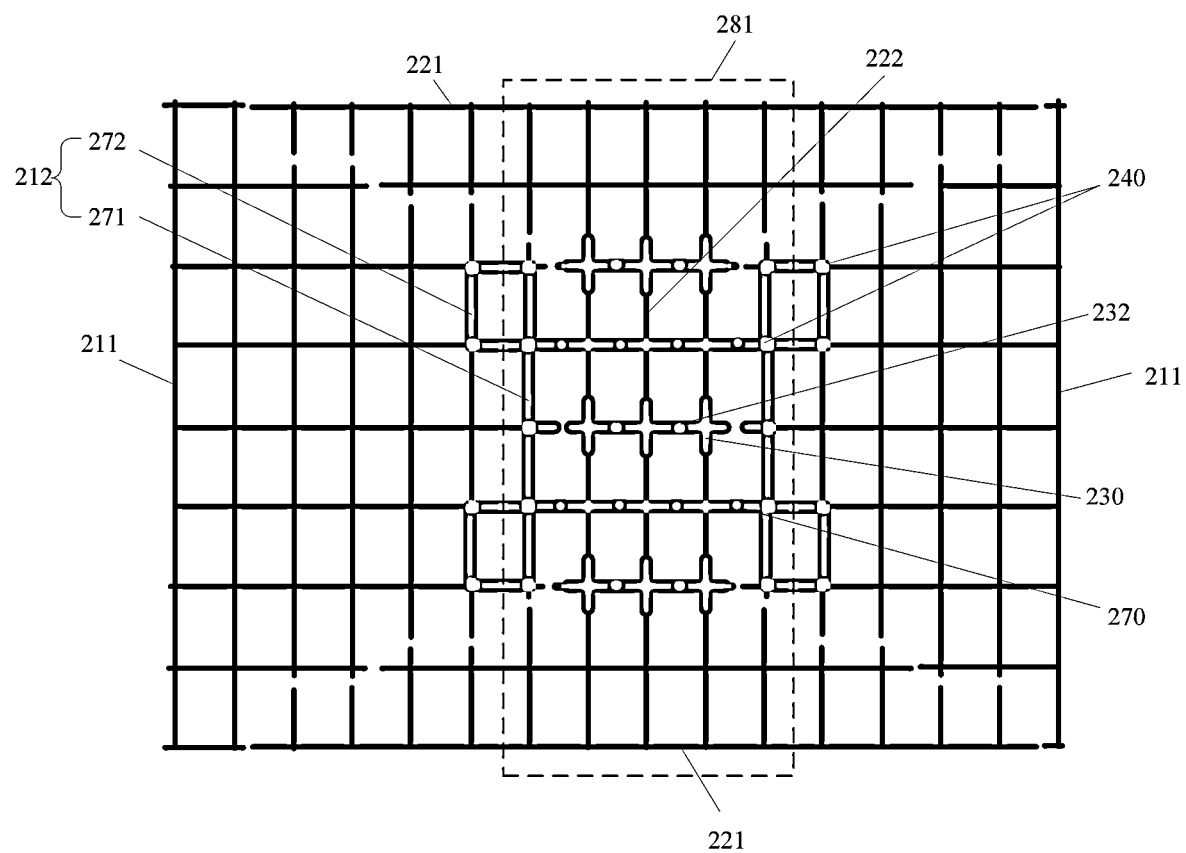
FIG. 9 is a schematic diagram 6 of a touch structure provided by at least one embodiment of the present disclosure.

FIG. 9 is a schematic diagram of a touch structure provided by still some embodiments of the present disclosure. For example, the touch structure includes a bendable region 281, and the bendable region 281, for example, is a region which can be bent in the using process. The first connection portion 212 includes a bending portion 271 located in the bendable region 281, the bending portion includes at least one second metal line 22, the at least one second metal line is provided with a hole 270, and a hole diameter of the hole is 25% to 90% of a line width of the second metal line where the hole is provided. The hole is a via hole.

For example, a hole 232 also can be provided in the dummy electrode 231, and a hole diameter of the hole, for example, is 25% to 90% of the line width of the second metal line 22 where the hole is provided. The hole is a via hole.

By providing the via hole on the second metal line 22 located in the bendable region 281, the stress by the second metal line 22 in the bending process can be effectively released so as to improve bending resistance of the touch structure.

For example, as shown in FIG. 9, the first connection portion 212 includes a polygon formed by connecting a plurality of second metal lines 22, at least part of the polygon is used as the bending portion 271, and the plurality of second metal lines 22 overlap with the plurality of first metal lines 21 in the direction perpendicular to the first conductive layer 201, respectively.

For example, the first connection portion further includes a plurality of second metal meshes 272 respectively connected with a plurality of vertexes of the polygon, and the plurality of second metal meshes 272 overlap with a plurality of first metal meshes in the second connection portion 222 in the direction perpendicular to the first conductive layer, respectively.

For example, in the insulating layer 203, a via hole 240 is provided corresponding to a vertex of each second metal mesh 272, respectively, and the second metal line 22 in the second metal mesh 272 is electrically connected with the first electrode main body portion 211 adjacent to the first connection portion 212 through the via hole 240.

For example, as shown in FIG. 9, the polygon included by the first connection portion 212 is a rectangle, and four vertexes of the rectangle are respectively connected with a second metal mesh 272. The second metal mesh 272 is of a rectangle shape, four vertexes of the second metal mesh 272 overlap with four vertexes of the first metal mesh 213, respectively, and each of four vertexes of the second metal mesh 272 is provided with one via hole 240, so as to electrically connect the first connection portion 212 with the first electrode main body portion 211.

With this arrangement, the number of the via holes for connecting the first connection portion 212 with the first electrode main body portion 211 can be increased, and the bending resistance of the first connection portion 212 can be improved.

For example, at least one vertex of each second metal mesh 272 is positioned in a non-bending region outside the bendable region 281, respectively. For example, each second metal mesh 272 is positioned in the non-bending region.

Figure 10:
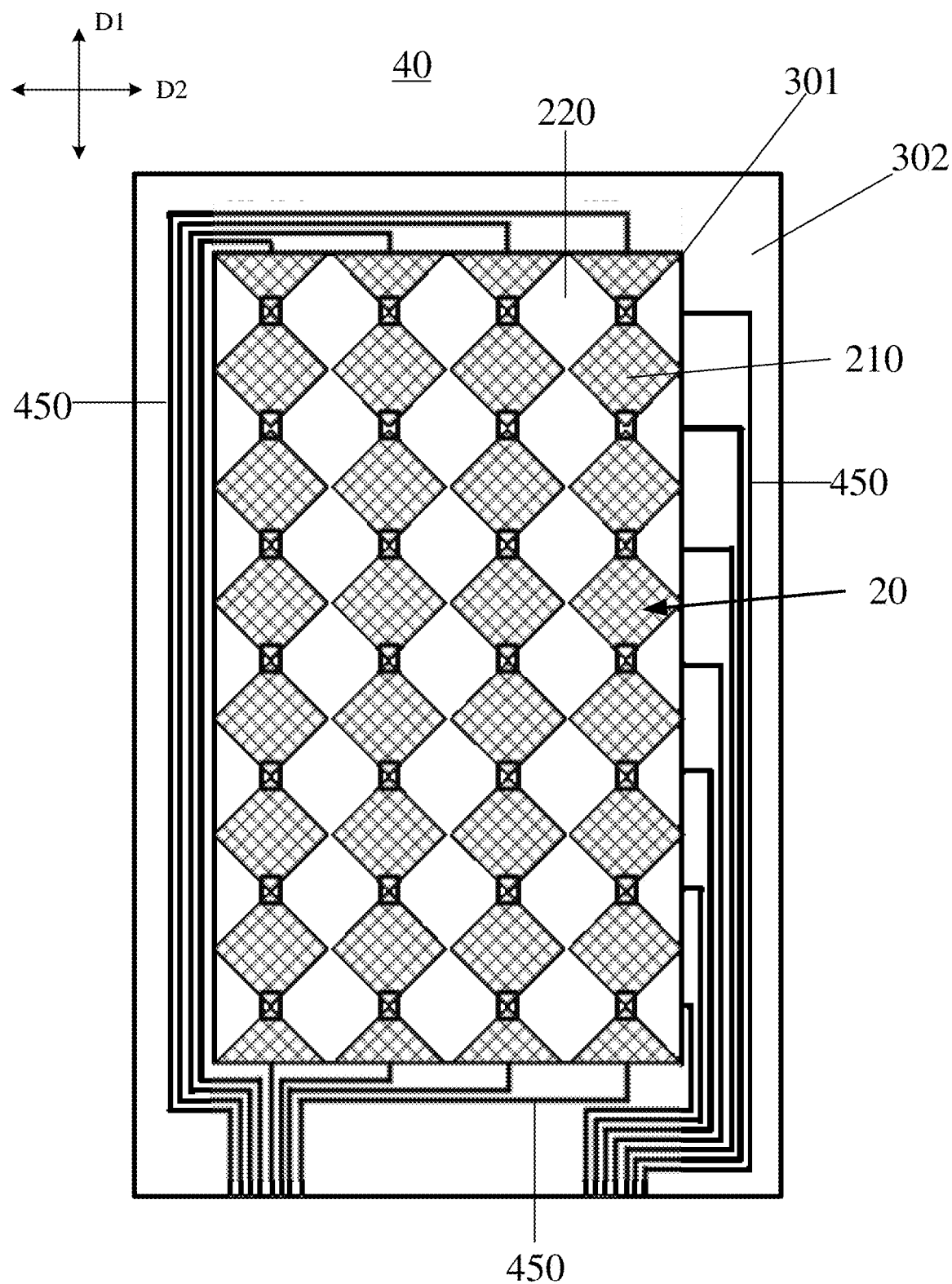
FIG. 10 is a schematic diagram of a touch panel provided by at least one embodiment of the present disclosure.

An embodiment of the present disclosure further provides a touch panel, the touch panel includes the above-mentioned touch structure 20. FIG. 10 is a schematic diagram of a touch panel provided by at least one embodiment of the present disclosure. As shown in FIG. 10, the touch panel 40 includes a touch region 301 and a non-touch region 302 positioned outside the touch region 301, and the touch structure 20 is positioned in the touch region 301. For example, the first touch electrode 210 extends along a length direction of the rectangle, and the second touch electrode 220 extends along a width direction of the rectangle. For clarity, the structures of the first touch electrode and the second touch electrode are not shown in detail in the drawing.

For example, as shown in FIG. 10, the touch panel 40 further includes a plurality of signal lines 450 positioned in the non-touch region 302. Each first touch electrode 210 and each second touch electrode 220 are electrically connected with one signal line 450, respectively, and are connected to a touch controller or a touch integrated circuit (not shown in the drawing) through the signal line. For example, the first touch electrode 210 is a touch driving electrode, the second touch electrode 220 is a touch sensing electrode, but the embodiments of the present disclosure do not make any limit to it.

The touch integrated circuit, for example, is a touch chip, and is used for providing a touch driving signal to the first touch electrode 210 in the touch panel 40, and receiving a touch sensing signal from the second touch electrode 220 and processing the touch sensing signal. For example, the processed data/signal is provided to a system controller to achieve a touch sensing function.

For example, as shown in FIG. 10, one end of each of the plurality of signal lines 450 connected with the touch integrated circuit may be arranged on the same side (e.g., the lower side in FIG. 10) of the touch region 301, so as to facilitate connection with the touch integrated circuit.

For example, as shown in FIG. 10, the first touch electrode 210 is longer than the second touch electrode 220 and has a higher load than the second touch electrode 220, and thus, in order to improve the signal transmission speed, two signal lines 450 can be arranged at both ends of a first touch electrode 210, respectively, and in the operation, the touch integrated circuit bi-directionally input the touch driving signal (bilateral driving) to a first touch electrode 210 through the two signal lines 450 at the same time, and then the signal loading speed on the first touch electrode 210 is improved, so that the detection speed can be improved.

For example, a material of the first conductive layer 201 or the second conductive layer 202 includes a metal material such as aluminum, molybdenum, copper, silver and the like, or an alloy material of those metal materials, e.g., a silver palladium copper (APC) alloy material.

For example, an average line width of the first metal line 21 or the second metal line 22 is 3 microns. For example, a width (a size along the length direction of the corresponding metal line) of the spacing 260 on the metal line is 5.2 microns.

For example, a material of the insulating layer 203 may be an inorganic insulating material, and for example, the inorganic insulating material is a transparent material. For example, the inorganic insulating material is oxide of silicon, nitride of silicon or oxynitride of silicon, such as silicon oxide, silicon nitride, silicon oxynitride and the like, or an insulating material including metal oxynitride, such as aluminum oxide, titanium nitride and the like.

For example, the material of the insulating layer 203 also may be an organic insulating material, so as to obtain excellent bending resistance. For example, the organic insulating material is a transparent material. For example, the organic insulating material is Optical Clear Adhesive (OCA). For example, the organic insulating material may include polyimide (PI), acrylic ester, epoxy resin, polymethyl methacrylate (PMMA) and the like.

At least one embodiment of the present disclosure further provides a touch display panel, including the touch structure 20 provided by any one of the above-mentioned embodiments.

Figure 11A:
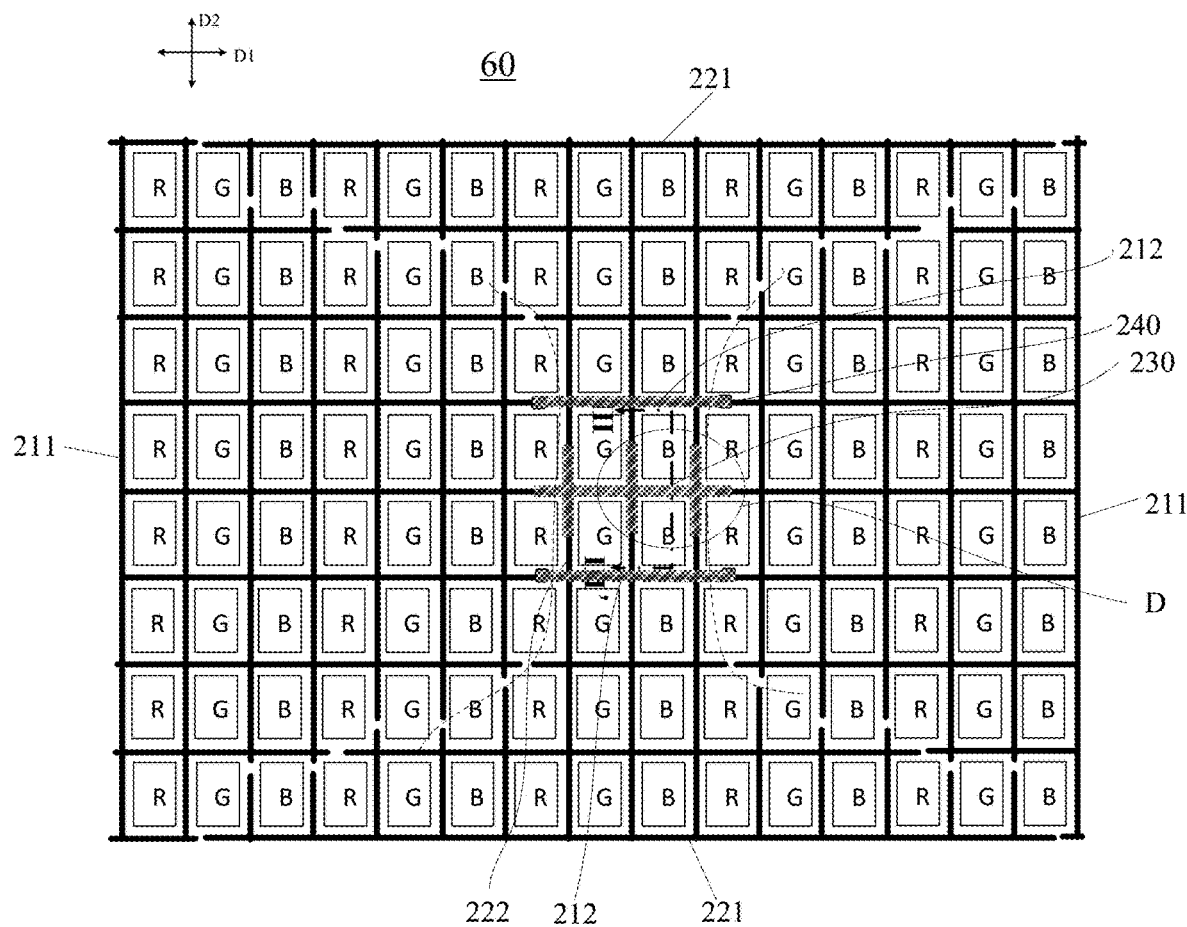
FIG. 11A is a schematic diagram of a touch display panel provided by at least one embodiment of the present disclosure.
Figure 11B:
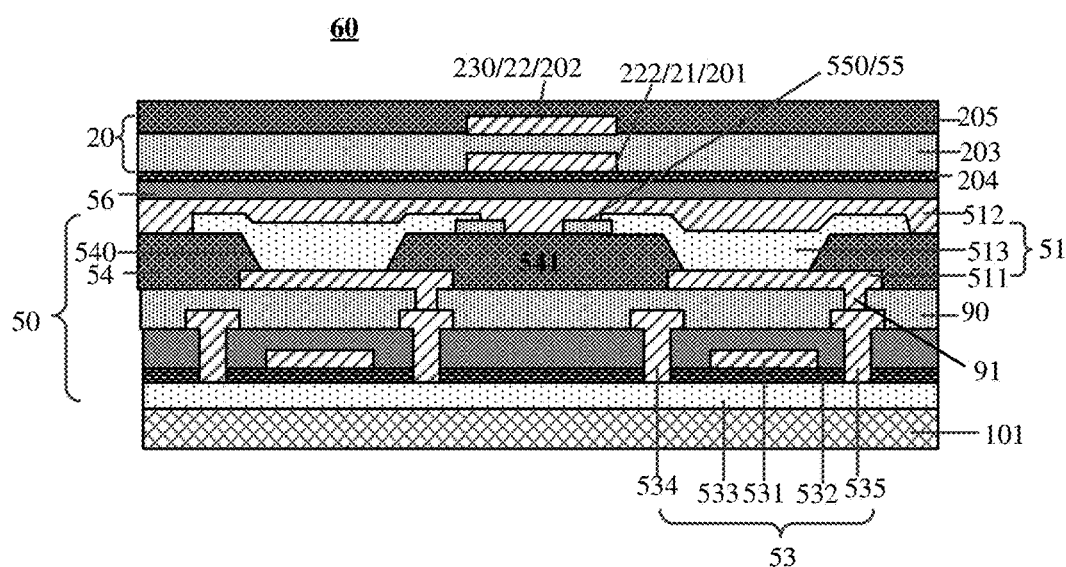
FIG. 11B is a section view of FIG. 11A along a section line III-III'.

FIG. 11A shows a structural schematic diagram of a touch display panel provided by at least one embodiment of the present disclosure, and FIG. 11B is a section view of FIG. 11A along a section line III-III'.

With reference to FIG. 11A to FIG. 11B, the touch display panel 60 includes a base substrate 101 and a display structure 50 and the touch structure 20 which are laminated on the base substrate 101, and the touch structure 20 is positioned above the display structure 50 and is closer to the side of a user in the using process.

For example, the touch display panel is an OLED display panel, and the display structure 50 includes a plurality of sub-pixels arranged in an array. For example, the plurality of sub-pixels include a red sub-pixel (R), a green sub-pixel (G) and a blue sub-pixel (B). Each sub-pixel includes a light emitting element 51. The display structure further includes a pixel definition layer 54, and the pixel definition layer includes an opening for exposing a first electrode of each light emitting element 51, so as to define a pixel opening region 540 of the sub-pixel where each light emitting element is positioned. The light emitting element 51, for example, is an OLED.

The embodiments of the present disclosure do not make any limit to the arrangement mode of the sub-pixels, exemplary illustration is carried out in a stripe pixel arrangement mode in FIG. 11A, and in some other examples, the sub-pixels also may be arranged in a Mosaic arrangement mode, a Delta arrangement mode, a Pentile arrangement mode and other sub-pixel rendering (SPR) modes.

FIG. 11A schematically shows the pixel opening region 540 of each sub-pixel with a rectangular box. However, the embodiments of the present disclosure do not make any limit to the shape of the pixel opening region, in other examples, the plane shape of the pixel opening region 540 also may be of other polygon (rhombus, pentagon, hexagon and the like) shapes or other shapes.

Orthographic projections of a plurality of first metal lines 21 and a plurality of second metal lines 22 on the base substrate 101 are all located outside the orthographic projections of a plurality of pixel opening regions 540 of a plurality of sub-pixels on the base substrate 101, i.e., the orthographic projections of a plurality of first metal lines 21 and a plurality of second metal lines 22 are within the orthogonal projections of pixel separating regions 541 between the pixel opening regions on the base substrate 101, and the pixel separating regions 541 are non-opening regions of the pixel definition layer 54. The pixel separating regions 541 are used for separating the pixel opening regions of a plurality of sub-pixels, and separating the light emitting layer of each sub-pixel so as to prevent the cross color.

For example, when the touch electrode formed by the metal mesh is integrated into the display panel, the metal line in the metal mesh needs to be arranged outside the pixel opening region of the display panel, so as to avoid reduction of a pixel aperture ratio which is caused by shielding of the metal line from the light. For example, the metal line in the metal mesh is arranged corresponding to the pixel separating region between the pixel opening regions. For example, an orthographic projection of a mesh hole of each first metal mesh 213 on the base substrate 101 covers the orthographic projection of at least one pixel opening region 540. For example, the mesh holes of the first metal mesh 213 and the pixel opening regions are correspondingly arranged one to one so as to expose the pixel opening regions 540 of the light emitting element of each sub-pixel. In some other examples, the mesh hole of at least one first metal mesh 213 covers the pixel opening regions of at least two sub-pixels. The embodiments of the present disclosure do not make any limit to it.

For example, the display substrate 50 further includes a spacer layer 55, and the spacer layer 55 can be used for supporting an evaporation mask when an organic light emitting layer 513 is formed by evaporation, so as to separate the pixel definition layer 54 from the evaporation mask to provide protection for the pixel definition layer 54; and the spacer layer 55 can also take an effect of further separating the adjacent organic light emitting layer. The spacer layer 55 generally includes a plurality of spacers 550 arranged at intervals, and the shape of the spacer 550 generally is in a cuboid shape, a column shape, a sphere shape or a semi-sphere shape or is not limited thereto.

For example, the pixel definition layer 54 and the spacer layer 55 may be respectively made of a material with a thickness of 1 μm to 5 μm, such as polyimide (PI) or polymethyl methacrylate (PMMA).

For example, as shown in FIG. 11B, the dummy electrode 230 and the spacer 550 at least partially overlap in a direction perpendicular to the base substrate 101. This arrangement can further improve the aperture ratio of the touch display panel.

Each sub-pixel includes the light emitting element 51 and a pixel driving circuit for driving the light emitting element 51 to emit light. The embodiments of the present disclosure do not make any limit to a type and a specific composition of the pixel driving circuit, and for example, the pixel driving circuit may be of a current driving type or may be of a voltage driving type, may be a 2T1C (i.e., two transistors and one capacitor, the two transistors include a driving transistor and a data writing-in transistor) driving circuit, or may be a driving circuit further including a compensating circuit (a compensating transistor), a light emitting control circuit (a light emitting control transistor), a reset circuit (a reset transistor) and the like on the basis of 2T1C.

For clarity, FIG. 11B only shows a first transistor 53 which is directly electrically connected with the light emitting element 51 in the pixel driving circuit. The first transistor 53 may be a driving transistor and is configured to work in a saturated state and control the magnitude of a current for driving the light emitting element 51 to emit light. For example, the first transistor 53 also may be a light emitting control transistor, and used for controlling the current for driving the light emitting element 51 to emit light to flow through or not. The embodiments of the present disclosure do not make any limit to the specific type of the first transistor.

For example, the light emitting element 51 is an OLED, and includes a first electrode 511, a light emitting layer 513 and a second electrode 512. One of the first electrode 511 and the second electrode 512 is an anode, while the other one is a cathode; and for example, the first electrode 511 is the anode, and the second electrode 512 is the cathode. For example, the light emitting layer 513 is an organic light emitting layer or a quantum dot light emitting layer. For example, besides the light emitting layer 513, the light emitting element 51 can also include auxiliary functional layers such as a hole injection layer, a hole transport layer, an electron injection layer, an electron transport layer and the like. For example, the light emitting element 51 is of a top-emitting structure, the first electrode 511 has reflectivity, and the second electrode 512 has transmittance or semi-transmittance. For example, the first electrode 511 is made of a high-work-function material to serve as the anode, and for example, is of an ITO/Ag/ITO laminated structure; and the second electrode 512 is made of a low-work-function material to serve as the cathode, and for example, is made of a semi-transmittance metal or metal alloy material, e.g., an Ag/Mg alloy material.

For example, the light emitting layer 513 may be made of a singlet-state fluorescent organic light emitting material, or a triplet-state phosphor organic light emitting material. The phosphor organic light emitting material generally needs to add a hole blocking layer (HBL) between the light emitting layer and the electron transport layer, or add an electron blocking layer (EBL) between the light emitting layer and the hole transport layer (HTL), and thus, compared to a singlet-state exciton, a triplet-state exciton is longer in service life and longer in diffusion length.

As shown in FIG. 11B, the pixel definition layer 54 and the spacer layer 55 are sequentially arranged on the first electrode 511 of the light emitting element 51. An opening is formed in the pixel definition layer 54 so as to include at least part of the first electrode 511 of the light emitting element 51, and the light emitting layer 513 is formed in the opening of the pixel definition layer 54 so as to form an active light emitting region of the sub-pixel, i.e., the pixel opening region 540.

The first transistor 53 includes a gate electrode 531, a gate insulating layer 532, an active layer 533, a first electrode 534 and a second electrode 535, the second electrode 535 is electrically connected with the first electrode 511 of the light emitting element 51 through a via hole 91 in an insulating layer 90, and the insulating layer 90, for example, is a planarization layer. The embodiments of the present disclosure do not make any limit to a type, a material and a structure of the first transistor 53, for example, the type of the first transistor may be a top-gate type, a bottom-gate type and the like, the active layer 533 of the first transistor 53 may be an amorphous silicon, poly-silicon (low temperature poly-silicon and high temperature poly-silicon) or oxide semiconductor (e.g., indium gallium tin oxide (IGZO)) and the like, and the type of the first transistor 53 may be an N type or a P type.

The transistors adopted in the embodiments of the present disclosure all can be thin film transistors or field effect transistors or other switching devices with the same characteristics, and in the embodiments of the present disclosure, illustration is carried out by taking the thin film transistor as an example. A source electrode and a drain electrode of the transistor adopted herein can be symmetric structurally, so there can be no differences between the source electrode and the drain electrode of the transistor in structure. In the embodiments of the present disclosure, in order to distinguish two electrodes of the transistor besides the gate electrode, it is directly described that one electrode is the first electrode, and the other electrode is the second electrode.

For example, as shown in FIG. 11B, the display structure 30 further includes a packaging layer 56 positioned between the light emitting element 51 and the touch structure 20, and the packaging layer 56 is configured to perform sealing on the light emitting element 51 to prevent moisture and oxygen outside from permeating into the light emitting element and a driving circuit, which causes damage to devices such as the light emitting element 51 and the like. For example, the packaging layer 56 may be of a single-layer structure or a multi-layer structure, and for example, includes an organic thin film, or an inorganic thin film or includes the multi-layer structure formed by alternately laminating the organic thin film and the inorganic thin film.

As shown in FIG. 11B, the touch display panel 60 further includes a buffer layer 204 positioned between the display structure 50 and the touch structure 20. For example, the buffer layer 204 is formed on the packaging layer 56, and used for improving the adhesion force between the touch structure 20 and the display structure 50. For example, the buffer layer 204 is an inorganic insulating layer, and for example, a material of the buffer layer 204 may be silicon nitride, silicon oxide or oxynitride of silicon. For example, the buffer layer 204 also may include a structure formed by alternately stacking a silicon oxide layer and a silicon nitride layer.

For example, the base substrate 101 may be a glass substrate, a silicon substrate or a flexible substrate, and for example, can be formed by a plastic material with excellent heat resistance and durability, e.g., polyimide (PI), polycarbonate (PC), polyethylene terephthalate (PET), polycarbonate, polyethylene, polyacrylate, polycarbonate, polyarylate, polyetherimide, polyether sulfone, polyethyleneterephthalate (PET), polyethylene (PE), polypropylene (PP), polysulfone (PSF), polymethyl methacrylate (PMMA), cellulose triacetate (TAC), cycloolefin polymer (COP), cycloolefin copolymer (COC) and the like.

Figure 12A:
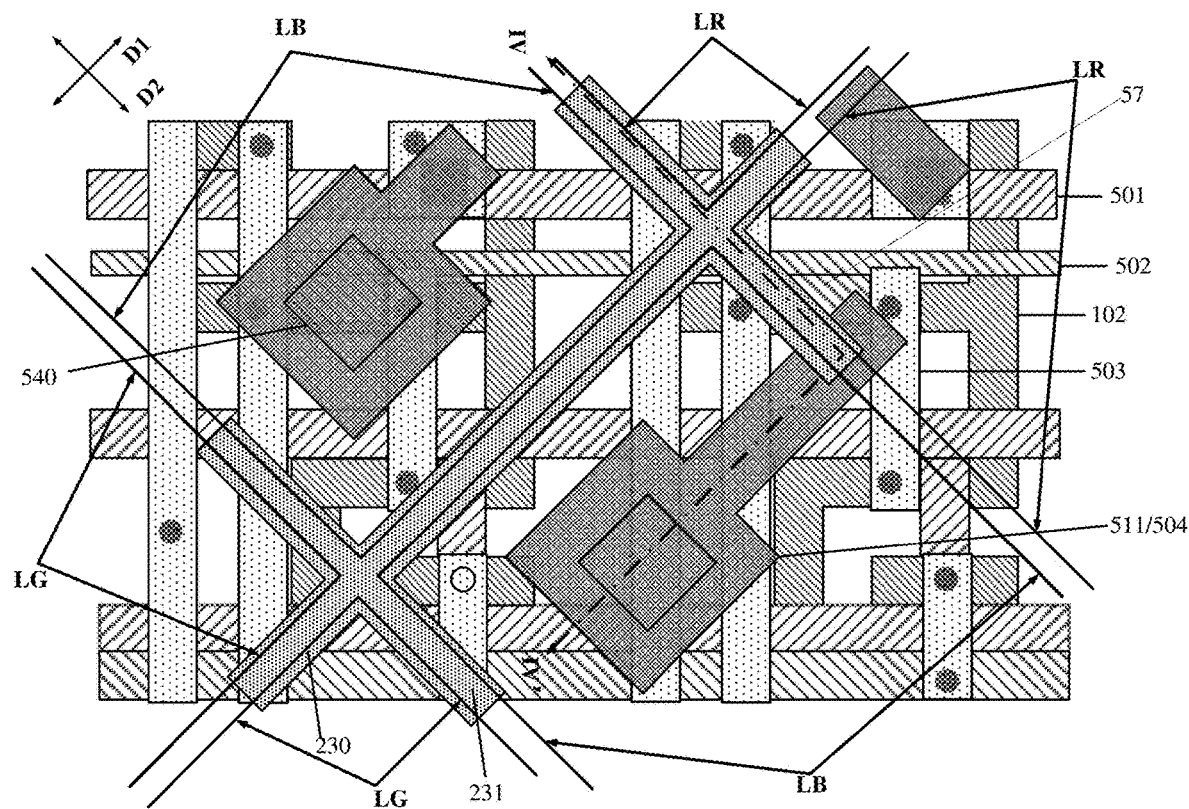
FIG. 12A is a partially enlarged schematic diagram of FIG. 11A.
Figure 12B:
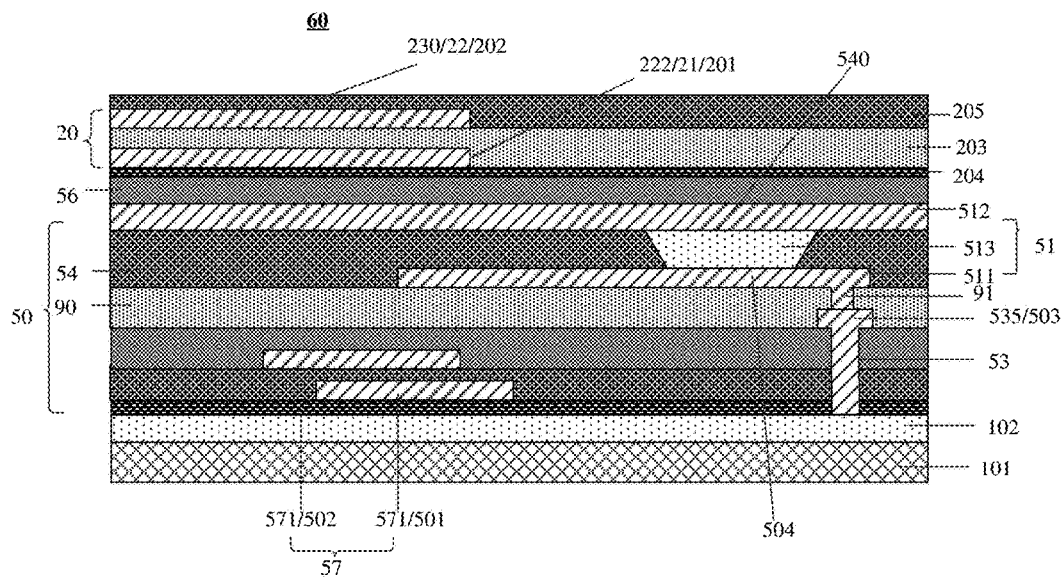
FIG. 12B is a section view of FIG. 12A along a section line IV-IV'.

FIG. 12A shows an enlarged schematic diagram of a region D in FIG. 11A, and FIG. 12B shows a section view of FIG. 12A along a section line IV-IV'.

With reference to FIG. 11A and FIG. 12A, FIG. 12A shows boundary lines LG, LR and LB of the light emitting layer of each sub-pixel, and for example, as shown in FIG. 12A, an orthogonal projection of the boundary lines on the base substrate are positioned within an orthogonal projection of the first metal line 21 or the second metal line 22 on the base substrate.

With reference to FIG. 12A to FIG. 12B, the display structure 50 includes a semiconductor pattern layer 102, a first conductive pattern layer 501, a second conductive pattern layer 502, a third conductive pattern layer 503 and a fourth conductive pattern layer 504 which are sequentially arranged on the base substrate 101.

For example, the semiconductor pattern layer 102 can include an active layer of each transistor in a pixel circuit, and the active layer, for example, can include a channel region of the transistor and a conductive source-drain contact region.

For example, the first conductive pattern layer 501 may include a gate electrode of each transistor in the pixel circuit and some scanning control lines (e.g., a light emitting control signal line, a reset control signal line and the like) connected with the gate electrode.

For example, the second conductive pattern layer 502 may include a power line, a capacitance electrode, a reset voltage line and the like.

For example, the third conductive pattern layer 503 may include a data line, a power line and the like. The third conductive pattern layer 503 further may include some connecting electrodes.

For example, the fourth conductive pattern layer 504 may include the first electrode 511 of the light emitting element of each sub-pixel.

For example, the pixel circuit of each sub-pixel further includes a storage capacitor 57, and the storage capacitor 57, for example, is electrically connected with a driving transistor, and is configured to store a data signal and related information of a threshold voltage of the driving transistor so as to implement threshold compensation on the driving transistor. For example, the storage capacitor 57 includes a first capacitance electrode 571 and a second capacitance electrode 572 which directly face each other. For example, the first capacitance electrode 571 and the second capacitance electrode 572 are positioned in the second conductive pattern layer 502 and the first conductive pattern layer 501, respectively.

For example, the pixel circuit of each sub-pixel further includes a driving transistor (which is not shown), and the driving transistor is configured to control a driving current flowing through the light emitting element. For example, the second capacitance electrode 572 serves as a gate electrode of the driving transistor at the same time.

For example, as shown in FIG. 12B, the first electrode 511 of the light emitting element 51 is electrically connected with the first transistor 53 through the via hole 91 in the insulating layer 90. The dummy electrode 230, the first electrode 511 of the light emitting element 51 and the first capacitance electrode 571 overlap with each other in the direction perpendicular to the base substrate 101. This arrangement can improve the aperture ratio of the display panel as much as possible.

Figure 12C:
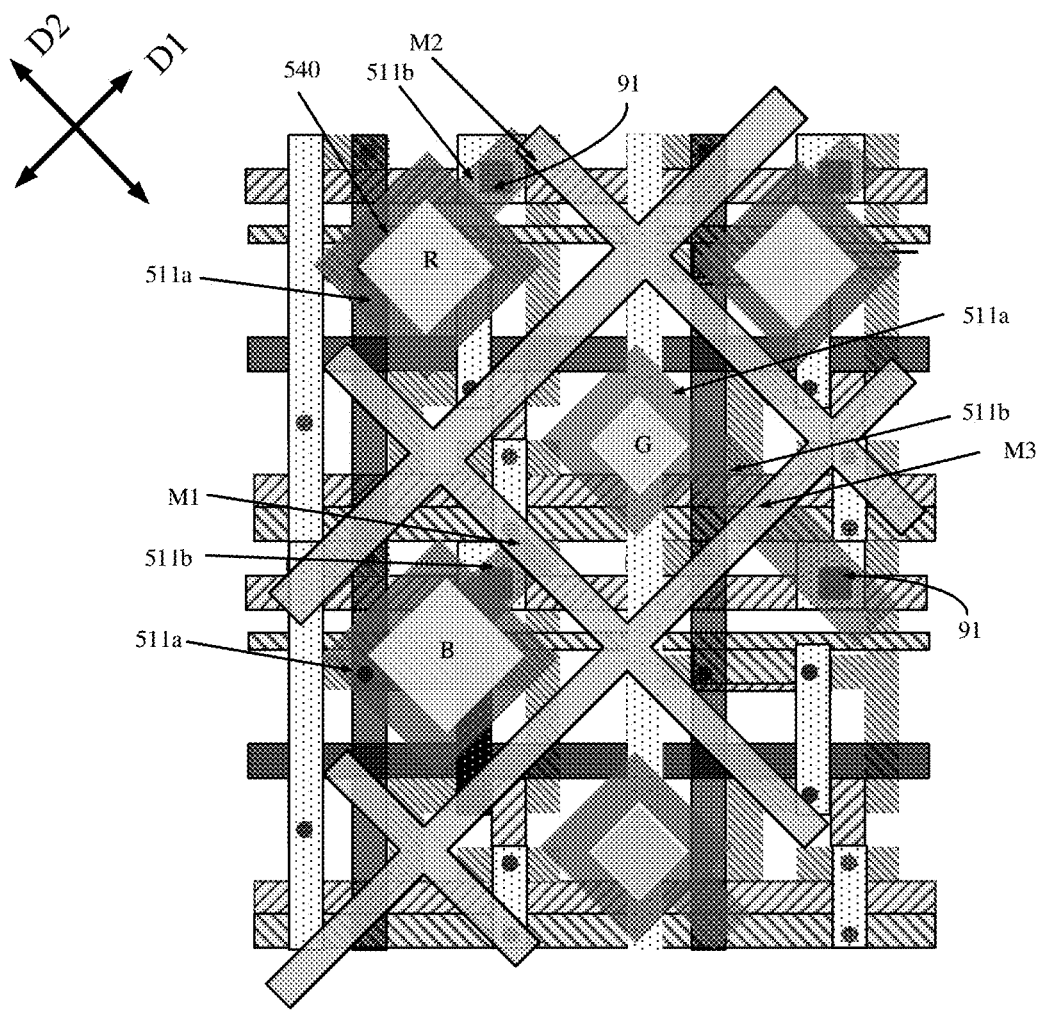
FIG. 12C is a schematic diagram of a touch display panel provided by another embodiment of the present disclosure.

FIG. 12C is a schematic diagram of a touch display panel provided by some other embodiments of the present disclosure. As shown in FIG. 12C, a plurality of sub-pixels include a first sub-pixel, a second sub-pixel and a third sub-pixel, and the first sub-pixel, the second sub-pixel and the third sub-pixel respectively emit light of different colors. The areas of the pixel opening regions 540 of the first sub-pixel, the second sub-pixel and the third sub-pixel are sequentially reduced. For example, the first sub-pixel is a blue sub-pixel (B), the second sub-pixel is a red sub-pixel (R), and the third sub-pixel is a green sub-pixel (G). Due to high light emitting efficiency of a green light emitting material, the area of the opening region of the green sub-pixel can be set to be relatively small; and due to the short service life of a blue light emitting material, a relatively large light emitting area is required for improving light emitting stability of the display substrate.

For example, the first electrode of the light emitting element of each sub-pixel includes a main body portion 511a and an extension portion 511b, the main body portion 511a is mainly used for driving the light emitting layer to emit light, and the main body portion 511a overlaps with the pixel opening region 450 of the sub-pixel to which the light emitting element belongs in the direction perpendicular to the base substrate. As shown in FIG. 12C, an orthographic projection of the main body portion 511a of the first electrode of the light emitting element on the base substrate covers an orthographic projection of the opening region 450 of the sub-pixel to which the light emitting element belongs on the base substrate. For example, a plane shape of the main body portion 511a of the first electrode is a polygon, e.g., a quadrangle (e.g., a rectangle), a pentagon or a hexagon and the like.

For example, the extension portion 511b is used for being electrically connected with the pixel circuit through the via hole 91 (refer to FIG. 12B). The extension portion 511b does not overlap with the pixel opening region of the sub-pixel in the direction perpendicular to the base substrate, thereby avoiding the bad problems such as color deviation caused by the influence of the via hole 91 on the flatness of the light emitting layer.

For example, as shown in FIG. 12C, both the extension portion 511a of the first electrode of the light emitting element of the first sub-pixel and the extension portion 511b of the first electrode of the light emitting element of the second sub-pixel extend along a first direction D1, and the extension portion 511b of the first electrode of the light emitting element of the third sub-pixel extends along a second direction D2.

As shown in FIG. 12C, the extension portion 511b of the first electrode of the light emitting element of the first sub-pixel overlap with the first conductive layer 201 in the direction perpendicular to the base substrate and has a first overlapping area M1, the extension portion 511b of the first electrode of the light emitting element of the second sub-pixel overlap with the first conductive layer 201 in the direction perpendicular to the base substrate and has a second overlapping area M2, and the extension portion of the first electrode of the light emitting element of the third sub-pixel overlap with the first conductive layer 201 in the direction perpendicular to the base substrate and has a third overlapping area M3. This arrangement can improve the aperture ratio of the display panel to the greatest extent.

For example, the third overlapping area M3 is greater than at least one of the first overlapping area M1 and the second overlapping area M2. For example, the first overlapping area M1, the second overlapping area M2 and the third overlapping area M3 are sequentially increased. As shown in FIG. 12C, the third overlapping area M3 is greater than the first overlapping area M1 and greater than the second overlapping area M2.

For example, the extension portion (a non-light-emitting region) of the first electrode of the light emitting element is liable to reflect ambient light or light emitted by the light emitting layer into the pixel opening region of the adjacent sub-pixel, resulting in the problem of light emission crosstalk or poor light mixing effect, and thus, the first metal line in the first conductive layer is arranged to shield the extension portion of the first electrode of the light emitting element of each pixel, so that the problems of light emitting interference and poor light mixing effect can be avoided. Due to high light emitting efficiency of the green light emitting material, the area of a shielded portion of the extension portion of the first electrode of the light emitting element of the green sub-pixel (i.e., the third sub-pixel) is set to be relatively large, which is helpful to further improve the above problems.

For example, as shown in FIG. 12C, the extension portion 511b of the first electrode of the light emitting element of the third sub-pixel overlaps with an intersection of two first metal lines 201.

Figure 13A:
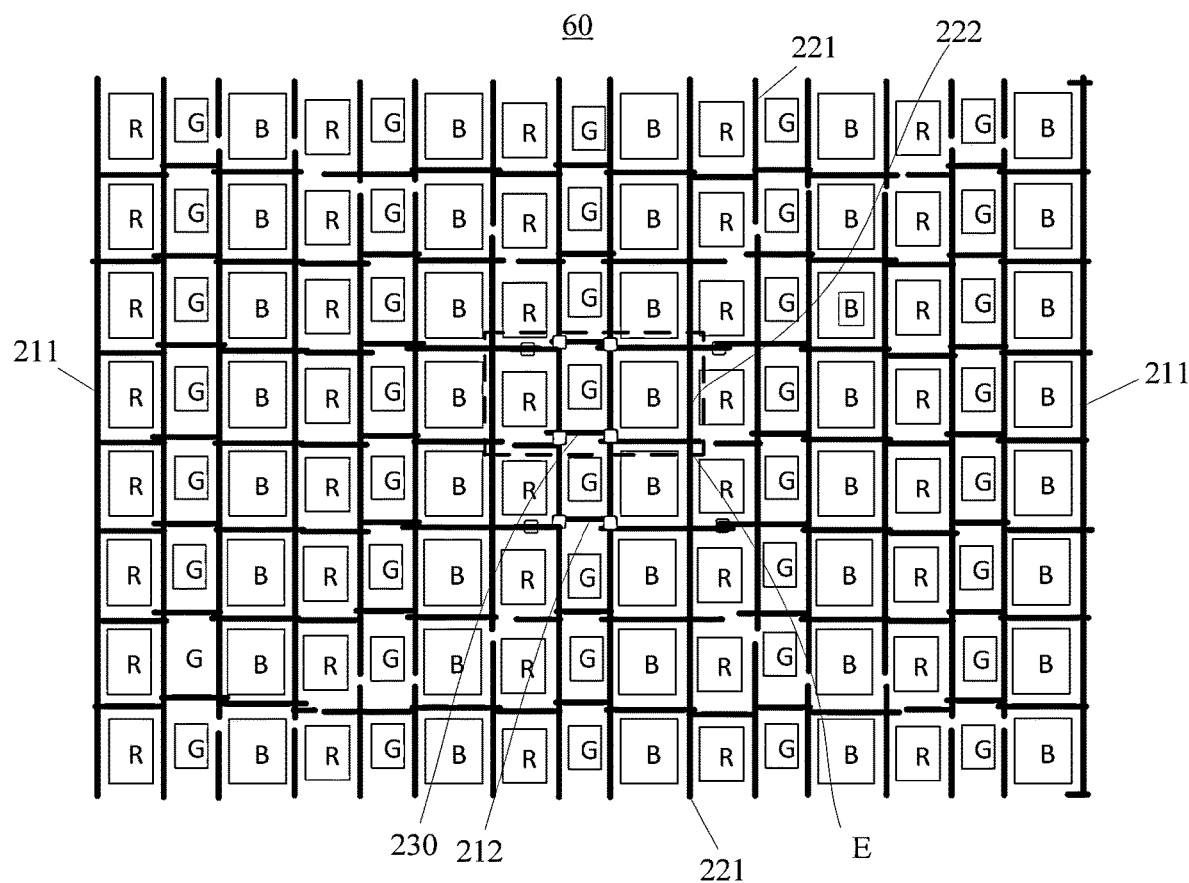
FIG. 13A-FIG. 13C are schematic diagrams of a touch display panel provided by another embodiment of the present disclosure.
Figure 13B:
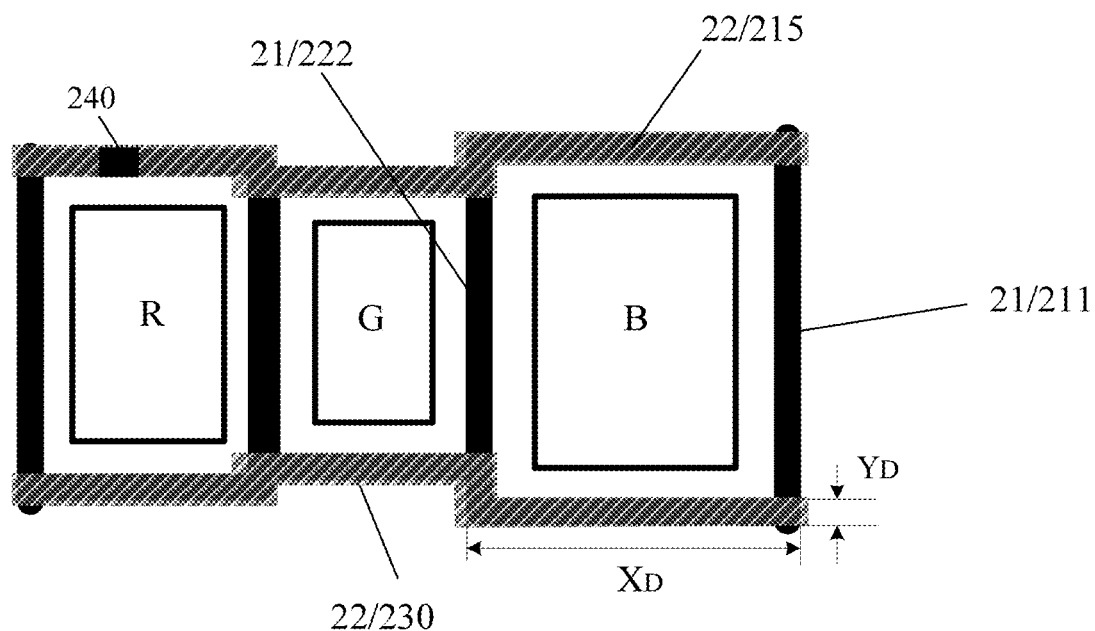
Figure 13C:
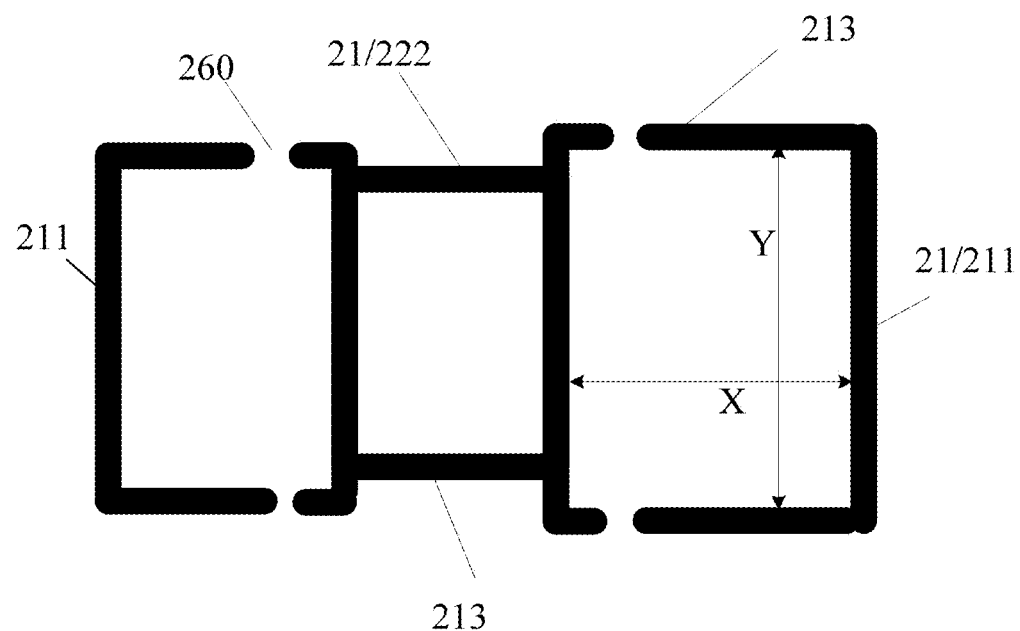

FIG. 13A is a structural schematic diagram of a touch display panel provided by still some embodiments of the present disclosure, FIG. 13B is an enlarged schematic diagram of a region E in FIG. 13A, and FIG. 13C shows a pattern of a first conductive layer in the region E. FIG. 13A to FIG. 13C show an adjacent first connection line 215 and dummy electrode 230 and a first metal mesh 213 positioned between them. For example, the first connection line 215 and the dummy electrode 230 are spaced by three adjacent first metal meshes 213 positioned on the same row. For example, the three first metal meshes 213 are arranged corresponding to a red sub-pixel (R), a green sub-pixel (G) and a blue sub-pixel (B), respectively. For example, an area of a pixel opening region of the green sub-pixel is the minimum, while an area of an opening region of the blue sub-pixel is the maximum. Correspondingly, the three first metal meshes 213 are different from each other in size, and vertexes of the adjacent first metal meshes do not overlap.

As shown in FIG. 13C, the three first metal meshes 213 include three portions insulated from each other and sequentially arranged in a first direction D1, the middle portion belongs to a second connection portion 222, and the portions on both sides belong to the first electrode main body portion 211 adjacent to and insulated from the second connection portion 222, respectively. The second connection portion 222 is spaced and insulated from the first electrode main body portion 211 through a spacing 260 in a first metal line 21.

As shown in FIG. 13A to FIG. 13C, the dummy electrode 230 includes three second metal lines 22 corresponding to the three first metal meshes 213, respectively. With reference to FIG. 8A to FIG. 8B, the area of the dummy electrode 230 can be approximately equal to the total area of the three second metal lines 22, the lengths of the three second metal lines 22 respectively are X1, X2 and X3, and the width of each second metal line 22 is $Y_D$. An mesh hole of the first metal mesh 213 corresponding to each second metal line 22 is of a rectangle shape, and a length and a width of the mesh opening are X and Y, respectively. Therefore, the $S1=X_D*Y_D$, $S2=X*Y$, and the following relationship is met:

$$a < \frac{X_D \times Y_D}{X \times Y} < b,$$

where $0.05<a<0.2$; $0.1<b<0.3$; for example, $0.1<a<0.2$, and $0.12<b<0.24$; and $a<b$.

The embodiments of the present disclosure do not make any limit to the shape of the dummy electrode 230, and when the shape of the dummy electrode 230 is changed, the total area of the dummy electrode 230 can be correspondingly calculated. For example, as shown in FIG. 3A, a plurality of second metal lines 22 in the dummy electrode 230 are positioned on the same straight line, the dummy electrode 230 is of a rectangle shape, and the length and the width of the dummy electrode 230 are $X_D$ and $Y_D$, respectively, and thus, the area of the dummy electrode 230 is that $S1=X_D*Y_D$.

Table 1 shows test data of the touch display panels with first metal meshes in different sizes. In this experiment, the dummy electrode 230 is of a rectangle shape, and the length and the width of the dummy electrode 230 are $X_D$ and $Y_D$, respectively. For example, in Group 1 to Group 4, the average width $Y_D$ of the second metal lines is 3 microns; and in Contrast Group, the average width $Y_D$ of the second metal lines is 5 microns. The average length $X_D$ of the second metal lines is equal to the length X of the mesh hole of the corresponding first metal mesh 213.

TABLE 1

|  | Group 1 | Group 2 | Group 3 | Group 4 | Contrast Group | Pixel Color |
|---|---|---|---|---|---|---|
| $X_D$ (um) | 64.6 | 82.6 | 60 | 82.7 | 64.6 | |
| X (um) | 34.8 | 39.8 | 32.8 | 48.1 | 32.8 | B |
| Y (um) | 33.2 | 39.8 | 33.2 | 48.1 | 31.2 | |
| X (um) | 29.9 | 35.8 | 28.5 | 32.3 | 27.9 | G |
| Y (um) | 30.2 | 31.1 | 25.2 | 39 | 28.2 | |
| X (um) | 31.6 | 34.3 | 29.4 | 41.4 | 29.6 | R |
| Y (um) | 31.2 | 33.2 | 29.5 | 41.4 | 29.2 | |
| Aperture Ratio | 15% | 19% | 17% | 19% | 14% | |
| C0 | 6.9 pF | 7.3 pF | 7.0 pF | 6.7 pF | 8.2 pF | |

For example, in consideration of factors of the service life of a light emitting material and the like, the area of the pixel opening region of the green sub-pixel is the minimum, while the area of the opening region of the blue sub-pixel is the maximum; and correspondingly, the area of the mesh hole of the metal mesh corresponding to the green sub-pixel is the minimum, and the area of the mesh hole of the metal mesh corresponding to the blue sub-pixel is the maximum.

It can be seen from Table 1 that compared to the touch display panel in Contrast Group, the touch display panels meeting the relationship expression above and corresponding to Group 1 to Group 4 have higher aperture ratios and lower reference capacitances C0, so that the touch sensitivity of the touch display panel is improved while the aperture ratio is improved.

The above is illustrated by taking a case that both the first metal mesh and the dummy electrode are of a rectangle shape as an example, and when the first metal mesh and the dummy electrode are of other shapes, the area of the mesh hole of the first metal mesh and the area of the dummy electrode can be correspondingly calculated and corresponding design can be carried out so as to meet the relationship above.

It should be illustrated that the first metal mesh herein may be not a complete mesh, the first metal line on at least one side of the first metal mesh may have a spacing, and in this case, the area of the mesh opening of the first metal mesh refers to an area of a mesh hole of the complete mesh defined by each side of the first metal mesh.

To a certain extent, the larger the area of the mesh hole of the first metal mesh, the lower the influence on the pixel opening region is, and the lower the touch sensitivity is; and the larger the area of the dummy electrode is, the higher the influence on the pixel opening region is, and the higher the touch sensitivity is. The above-mentioned setting can be helpful for improving the aperture ratio of the display panel and the sensitivity of touch detection.

Figure 14A:
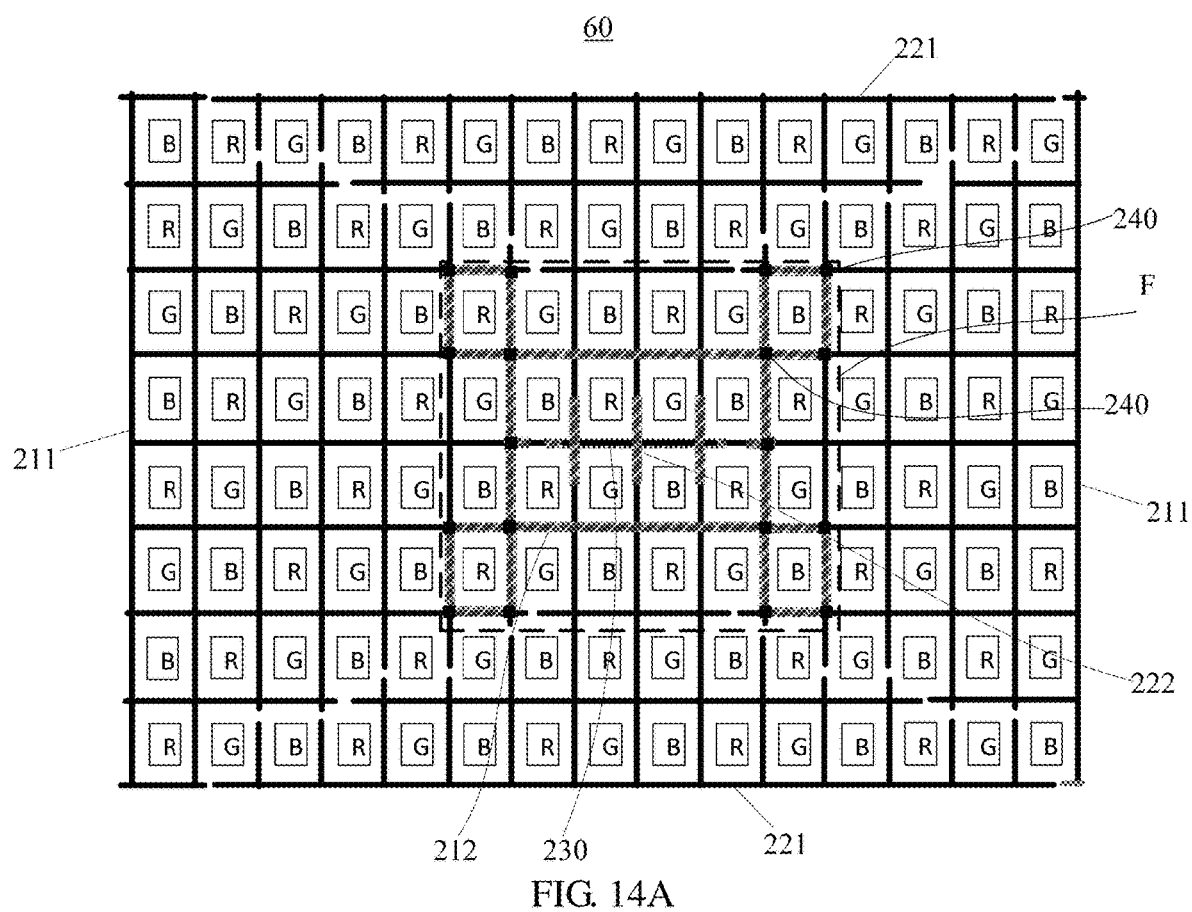
FIG. 14A-FIG. 14B are schematic diagrams of a touch display panel provided by still another embodiment of the present disclosure.
Figure 14B:
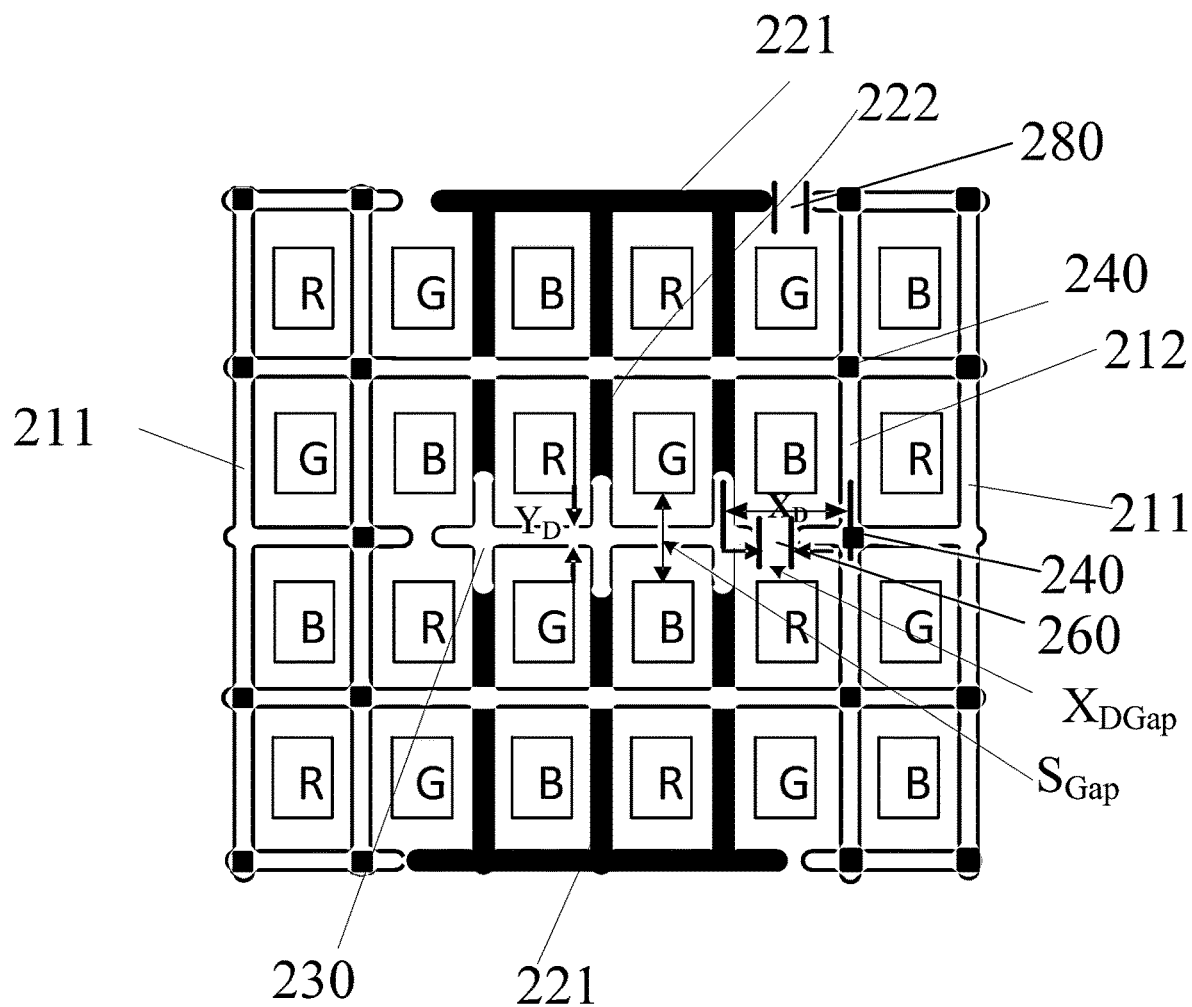

FIG. 14A is a schematic diagram of a touch display panel provided by some other embodiments of the present disclosure, and FIG. 14B is an enlarged schematic diagram of a region F in FIG. 14A.

As shown in FIG. 14A to FIG. 14B, a dummy electrode 230 is insulated from a first connection portion 212 through a spacing 260 on a second metal line 22, the spacing 260 separates the second metal line 22 into a first portion and a second portion, and the first portion belongs to the dummy electrode 230, and the second portion belongs to the first connection portion 212.

For example, a plurality of sides of each first metal mesh 213 are in parallel to a plurality of sides of an outline of a corresponding pixel opening region, respectively.

For example, two sides of two adjacent pixel opening regions close to each other are in parallel to each other, and one first metal line 21 is arranged between them; both orthographic projections of the two sides of two adjacent pixel opening regions close to each other on a base substrate 101 are in parallel to an orthographic projection of the first metal line 21 on the base substrate 101, and are has the same pitch as the orthographic projection of the first metal line 21 on the base substrate 101; and namely, the first metal line 21 between two adjacent pixel opening regions is positioned at the middle position of a gap between the two pixel opening regions, and the minimum distances (the distance from the edge of the pixel opening area closest to the first metal line) between the first metal line 51 and the two pixel opening regions are the same.

This arrangement can avoid a case that the distance between the first metal line and either of two pixel opening regions on both sides of the first metal line is excessively short to cause the negative influence on light of the pixel opening region; and in addition, this arrangement makes the first metal line have the same influence on the light of the two pixel opening regions, thereby improving uniformity of display.

In order to facilitate illustration, a distance between the orthographic projections of two sides of two adjacent pixel opening regions on the base substrate 101 is called as spacing (PDL GAP) of the two adjacent pixel opening regions, here, the two sides are in parallel and close to each other.

For example, as shown in FIG. 14B, an average width $Y_D$ of the second metal line 22, a size (i.e., a size of the spacing along an extension direction of the metal line where the spacing is positioned) $X_{DGap}$ of the spacing 260 and the spacing $S_{Gap}$ between the adjacent pixel opening regions meet:

$$0 < \frac{Y_D}{S_{Gap}} < 0.2$$

Herein, the spacing between the adjacent pixel opening regions refers to spacing between any two directly adjacent pixel opening regions. To a certain extent, the larger the average width $Y_D$ of the second metal line 22 is, the larger the area of the dummy electrode is, the higher the influence on the pixel opening region is, and the higher the touch sensitivity is; and the larger the spacing $S_{Gap}$ between the adjacent pixel opening regions is, the lower the influence of the metal line on the pixel opening region is, and the lower the touch sensitivity is. The above-mentioned setting can be helpful for improving the aperture ratio of the display panel and the sensitivity of touch detection.

For example, an average length XD of the second metal line 22 and the size (i.e., the size of the spacing along the extension direction of the second metal line where the spacing is positioned) $X_{DGap}$ of the spacing 260 positioned in the second metal line 22 meet:

$$0.1 < \frac{X_{DGap}}{X} < 0.5.$$

Reduction of the size of the spacing 260 is helpful for increasing the area of the first connection portion 212 or the area of the dummy electrode 230, and is helpful for improving the touch sensitivity; but if the size of the spacing 260 is excessively small, the risk of short circuit between the first connection portion 212 and the dummy electrode 230 will be caused. By the above-mentioned setting, it can be ensured that the touch sensitivity is improved under the process yield.

The relationship expression above is also applicable to a spacing on the first metal line 21. As shown in FIG. 14B, a first electrode main body portion 211 is insulated from an adjacent second touch electrode 220, e.g., a second electrode main body portion 221 or a second connection portion 222, through the spacing 280 on the first metal line 21. The spacing 280 separates the first metal line 21 into a first portion and a second portion, the first portion belongs to the first electrode main body portion, and the second portion belongs to the second electrode main body portion or the second connection portion. An average length $X_D$ and an average width $Y_D$ of the first metal line, a size $X_{DGap}$ of the spacing 280 and the spacing $S_{Gap}$ between the adjacent pixel opening regions meet:

$$0 < \frac{Y_D}{S_{Gap}} < 0.2; 0.1 < \frac{X_{DGap}}{X} < 0.5.$$

At least one embodiment of the present disclosure further provides a fine metal mask for producing the touch display panel provided by any one of the embodiments of the present disclosure. The fine metal mask includes a mask hole, the mask hole is used for exposing a pixel opening region of a first sub-pixel of a display structure so as to form a light emitting layer of a light emitting element of the first sub-pixel, and an area of the mask hole is S3. An orthographic projection of the pixel opening region of the first sub-pixel on a base substrate is positioned within an orthographic projection of a mesh hole of a corresponding first metal mesh on the base substrate, and an area of the mesh hole of the first metal mesh is S4. In the evaporation process, the mask hole of the fine metal mask exposes the corresponding pixel opening region, and a light emitting material is deposited to the corresponding pixel opening region through the mask hole.

For example, a line width of the fine metal mask is greater than that of the first metal line. An area of the mask hole corresponding to the first sub-pixel is greater than that of the mesh hole of the first metal mesh corresponding to the first sub-pixel. For example, an orthographic projection of the mask hole corresponding to the first sub-pixel on the base substrate covers the orthographic projection of the mesh hole of the first metal mesh.

For example, with reference to FIG. 11B, the first metal line 21 in the first metal mesh at least partially overlaps with the light emitting layer 513 of the first sub-pixel corresponding to the first metal mesh in the direction perpendicular to the base substrate 101.

With this arrangement, in the premise of keeping a sufficient distance between the first metal line 21 and the pixel opening region 450, the phenomenon of light leakage of the edge of the pixel opening region 450 can be relieved and color mixing and cross color between the adjacent pixels can be avoided.

For example, when the first sub-pixel is a green sub-pixel or a red sub-pixel, the following relationship is met:

$$0 < \frac{s4}{s3} < 0.8.$$

For example, when the first sub-pixel is a blue sub-pixel, the following relationship is met:

$$0.9 < \frac{s4}{s3} < 1.$$

The first sub-pixels herein refer to sub-pixels emitting the same color of light in the display structure, and for example, the first sub-pixels are the red sub-pixels, the green sub-pixels or the blue sub-pixels. The light emitting layers of the same color of sub-pixels are formed by sharing the same mask.

The larger the mesh hole of the first metal mesh is, the lower the influence of the metal line on the pixel opening region is, and the lower the touch sensitivity is.

For example, because the area of the pixel opening region of the blue sub-pixel is large, it is necessary to make the corresponding first metal mesh larger so as to avoid the metal line adversely affecting the light in the pixel opening region; and for example, the area of the corresponding pixel opening region of the blue sub-pixel is equivalent to the area of the corresponding mesh hole of the first metal mesh.

For example, the areas of the opening regions of the red and blue sub-pixels are small, and thus, the corresponding mesh holes of the first metal meshes can be made small so as to improve the touch sensitivity.

The above-mentioned arrangement can be helpful for improving the aperture ratio of the display panel and the sensitivity of touch detection.

The fine metal mask provided by the embodiment of the present disclosure will be illustrated below by taking an example of forming the light emitting layer in the touch display panel shown in FIG. 11A.

Figure 15A:
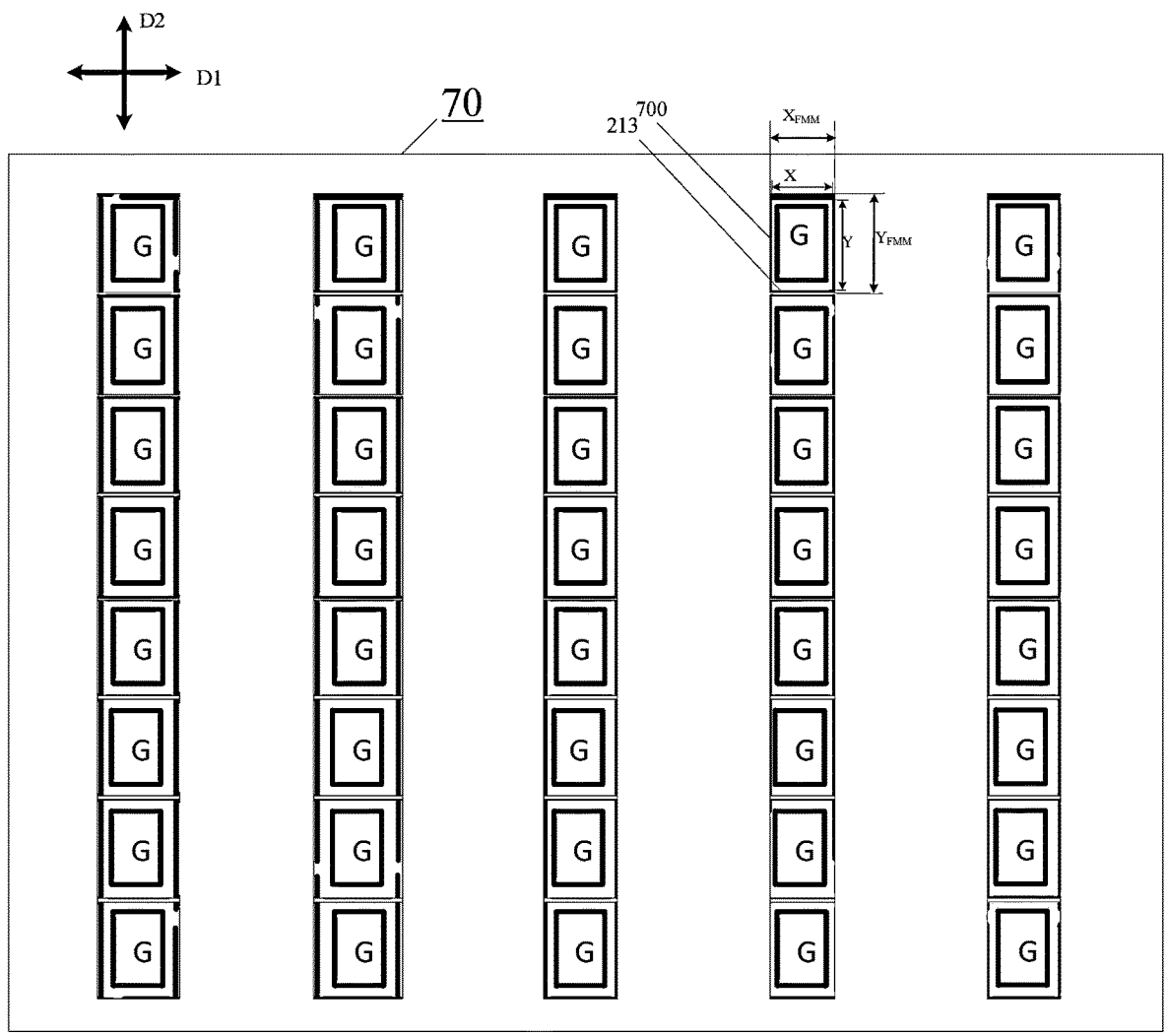
FIG. 15A-FIG. 15B are schematic diagrams of a Fine Metal Mask (FMM) provided by at least one embodiment of the present disclosure.
Figure 15B:
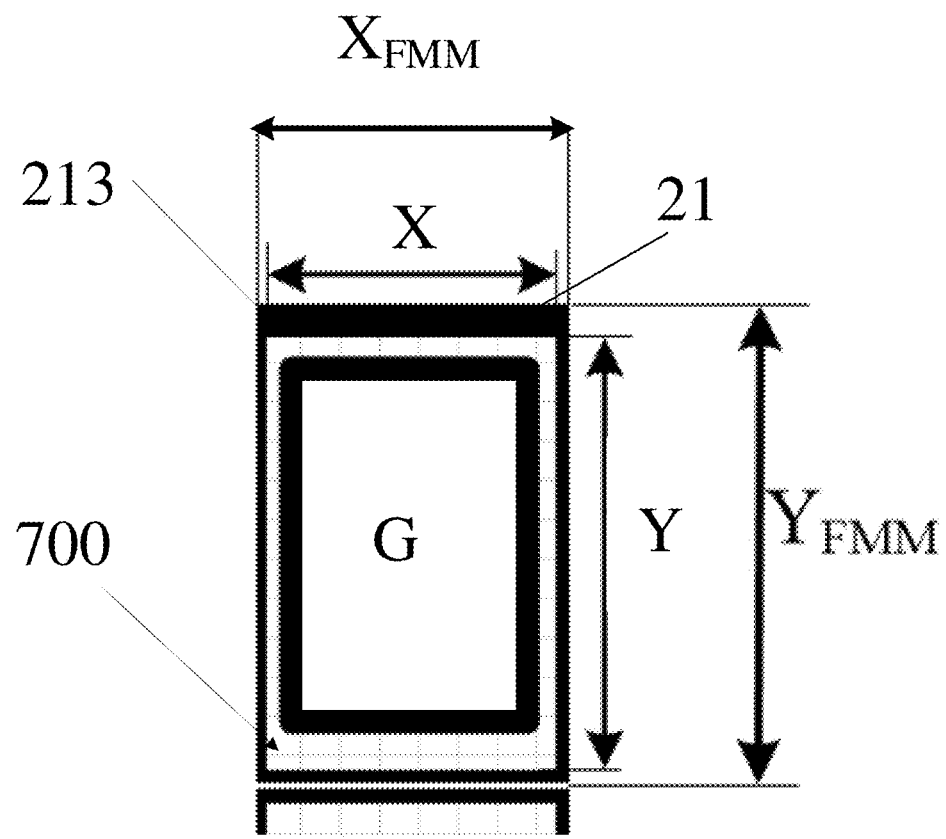

FIG. 15A shows a structural schematic diagram of a fine metal mask (FMM) provided by at least one embodiment of the present disclosure. In order to facilitate illustration, the fine metal mask 70 will be shown corresponding to the touch display panel shown in FIG. 11A for illustration. FIG. 15B shows a partially enlarged schematic diagram of FIG. 15A.

For example, as shown in FIG. 15A to FIG. 15B, a mask hole 700 of the fine metal mask 70 is of a rectangle shape, and has a length $X_{FMM}$ and a width $Y_{FMM}$. A mesh hole of a first metal mesh 213 corresponding to the mask hole 700 is of a rectangle shape, and has a length X and a width Y. Herein, both the mask hole 700 and the mesh hole of the first metal mesh 213 corresponding to the mask hole 700 cover (correspond) the same pixel opening region.

For example, as shown in FIG. 15A, the first sub-pixel is a green sub-pixel, and the fine metal mask 70 is used for forming a light emitting layer of the green sub-pixel in the touch display panel shown in FIG. 11A.

For example, the length $X_{FMM}$ of the mask hole 700 and the length X of the mesh hole of the first metal mesh 213 corresponding to the mask hole 700, meet:

$$0 < \frac{X}{X_{FMM}} < 0.9.$$

For example, the area of the mask hole 700 is that $S3 = X_{FMM} \times Y_{FMM}$; and the area of the mesh hole of the first metal mesh 213 corresponding to the mask hole 700 is $S4 = X \times Y$, and the following relationship is met:

$$0 < \frac{X \times Y}{X_{FMM} \times Y_{FMM}} < 0.8.$$

The area of the mask hole 700 is greater than that of the corresponding mesh hole of the first metal mesh 213. For example, the orthographic projection of the mesh hole of the first metal mesh 213 on the base substrate 101 is positioned within the orthographic projection of the mask hole 700 on the base substrate 101. For example, as shown in FIG. 15B, an orthographic projection of an outline of the mask hole 700 on the base substrate 101 is positioned on an orthographic projection of a first metal line 21 on the side of the first metal mesh 213 corresponding to the mask hole 700 on the base substrate 101.

For example, when the first sub-pixel is a red sub-pixel, the following relationships are simultaneously met:

$$0 < \frac{X}{X_{FMM}} < 0.9; \text{ and } 0 < \frac{X \times Y}{X_{FMM} \times Y_{FMM}} < 0.8.$$

For example, when the first sub-pixel is a blue sub-pixel, the following relationships are met:

$$0.95 < \frac{X}{X_{FMM}} < 1; \text{ and } 0.9 < \frac{X \times Y}{X_{FMM} \times Y_{FMM}} < 1.$$

In this case, for example, the area of the mask hole 700 is smaller than that of the mesh hole of the corresponding first metal mesh 213. For example, the orthographic projection of the mesh hole of the first metal mesh 213 on the base substrate 101 covers the orthographic projection of the mask hole 700 on the base substrate 101.

Table 2 shows test data of the touch display panels with first metal meshes in different sizes. The unit of each size is micron. Each group of data shows sizes of mesh holes of the first metal meshes and corresponding mask holes corresponding to pixel opening regions of different colors.

TABLE 2

|  | Group 1 | Group 2 | Group 3 | Group 4 | Contrast Group | Pixel Color |
|---|---|---|---|---|---|---|
| X | 34.8 | 39.8 | 32.8 | 48.1 | 32.8 | B |
| Y | 33.2 | 39.8 | 33.2 | 48.1 | 31.2 |  |
| X | 29.9 | 35.8 | 28.5 | 32.3 | 27.9 | G |
| Y | 30.2 | 31.1 | 25.2 | 39 | 28.2 |  |
| X | 31.6 | 34.3 | 29.4 | 41.4 | 29.6 | R |
| Y | 31.2 | 33.2 | 29.5 | 41.4 | 29.2 |  |
| $X_{FMM}*Y_{FMM}$ | 5.42*35.42 | 7.62*37.62 | 2.16*32.16 | 7.8*37.8 | 3.4*33.4 | R |
| $X_{FMM}*Y_{FMM}$ | 3.12*33.12 | 5.67*35.67 | 0.66*27.52 | 6.45*32.87 | 1.2*31.2 | G |
| $X_{FMM}*Y_{FMM}$ | 4.64*34.64 | 2.55*42.55 | 5.47*35.47 | 1.38*41.38 | 2.4*32.4 | B |
| Aperture Ratio | 15% | 19% | 17% | 19% | 14% |  |
| C0 | 6.9 pF | 7.3 pF | 7.0 pF | 6.7 pF | 8.2 pF |  |

It can be seen from Table 2 that compared to the touch display panel in Contrast Group, the touch display panels meeting the above-mentioned relationship expressions and corresponding to Group 1 to Group 4 have higher aperture ratios and lower reference capacitances C0, so that the touch sensitivity of the touch display panel is improved while the aperture ratio is improved.

For example, the shape of the orthographic projection of the light emitting layer of the light emitting element on the base substrate can be regarded to be the same with the shape of the corresponding mask hole, i.e., the light emitting layer and the mask hole have the consistent plane outlines. Therefore, the area of the orthographic projection of the light emitting layer of the light emitting element of the first sub-pixel on the base substrate is S3, i.e., S3 in the description above can be understood as the area of the orthographic projection of the light emitting layer of the light emitting element of the corresponding first sub-pixel on the base substrate, which will not be repeated herein.

An embodiment of the present disclosure further provides an electronic apparatus. The electronic apparatus includes the touch structure 20, the touch panel 40 or the touch display panel 60. For example, the electronic apparatus is a touch display apparatus integrated with a touch function, and the touch display apparatus can be any product or part with a display function or the touch function, such as a display, an OLED panel, an OLED television, electronic paper, a mobile phone, a tablet personal computer, a notebook computer, a digital photo frame, a navigator and the like.

Figure 16:
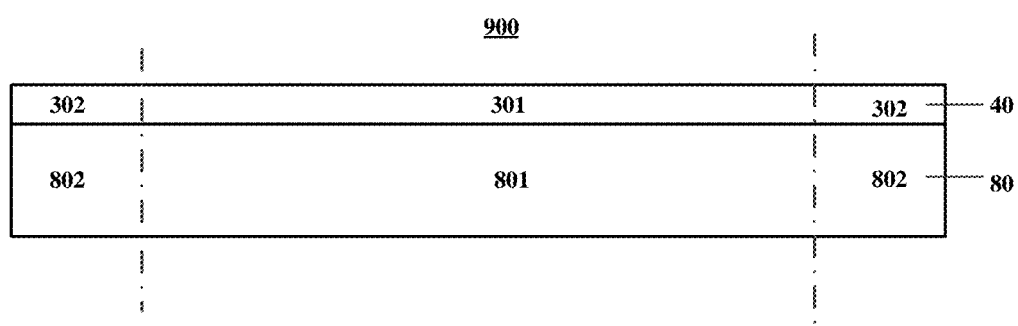
FIG. 16 is a schematic diagram of an electronic apparatus provided by at least one embodiment of the present disclosure.

FIG. 16 shows a schematic diagram of an electronic apparatus provided by an embodiment of the present disclosure. For example, the electronic apparatus 900 is a touch display apparatus, the touch display apparatus includes a touch panel 40 and a display panel 80, and the display panel 80 and the touch panel 40 are laminated. The display panel 80 includes a display region 801 and a non-display region 802. For example, the display region 802 and a touch region 301 of the touch panel 40 are aligned with each so as to correspond to each other, and the non-display region 802 and a non-touch region 302 of the touch panel 40 are aligned with each other so as to correspond to each other. The display panel 80 and the touch panel 40, for example, are fixed mutually by viscose, or are integrally formed, i.e., a touch structure 20 in the touch panel 40 is directly formed on the display panel 80 by taking the display panel 80 as a substrate.

The above is only an exemplary embodiment of the present disclosure, and is not intended to limit the protection scope of the present disclosure, which is determined by the appended claims.

What is claimed is:

1. A touch structure, comprising a first touch electrode and a second touch electrode,
   wherein the first touch electrode is extended along a first direction, the second touch electrode extends along a second direction, and the first direction is different from the second direction;
   the first touch electrode comprises a plurality of first electrode main body portions sequentially arranged along the first direction and a first connection portion for electrically connecting two adjacent first electrode main body portions, the plurality of first electrode main body portions are in a first conductive layer, and the first connection portion is in a second conductive layer different from the first conductive layer;
   the second touch electrode comprises a plurality of second electrode main body portions sequentially arranged along the second direction and a second connection portion for electrically connecting two adjacent second electrode main body portions, and the plurality of second electrode main body portions and the second connection portion are in the first conductive layer;
   the first conductive layer and the second conductive layer are insulated through an insulating layer; and the first connection portion and the second connection portion are overlapped in a direction perpendicular to the first conductive layer;
   the first conductive layer comprises a plurality of first metal meshes formed by a plurality of first metal lines; each of the plurality of first electrode main body portions and second electrode main body portions comprises multiple of first metal meshes, and the second connection portion comprises multiple of first metal meshes;

the second conductive layer comprises a plurality of second metal lines;

the touch structure further comprises a dummy electrode in the second conductive layer, and the dummy electrode is insulated from both the first touch electrode and the second touch electrode; and the dummy electrode is configured to be coupled with at least one selected from the group consisting of the first connection portion and the second connection portion through an electric field, wherein an area of the dummy electrode is S1; and an area of a mesh hole of any mesh defined by a projection of the dummy electrode on the first conductive layer and the plurality of first metal lines in the first conductive layer is S2, and a following relationship is met:

$$a < \frac{S1}{S2} < b,$$

where $0.05<a<0.2$; $0.1<b<0.3$; and $a<b$.

2. The touch structure according to claim 1, wherein an extension direction of at least one first metal line is identical with an extension direction of the dummy electrode, and the dummy electrode overlaps with the at least one first metal line in the direction perpendicular to the first conductive layer.

3. The touch structure according to claim 1, wherein the dummy electrode is in a rectangle shape, and a length and a width of the dummy electrode are $X_D$ and $Y_D$, respectively; and the mesh hole of the any mesh is in a rectangle shape, a length and a width of the mesh hole are X and Y, respectively, and a following relationship is met:

$$a < \frac{X_D \times Y_D}{X \times Y} < b,$$

where $0.05<a<0.2$; $0.1<b<0.3$; and $a<b$.

4. The touch structure according to claim 1, wherein the dummy electrode comprises n rectangles connected with each other, lengths of the n rectangles are X1, X2 ... Xn, respectively, and widths of the n rectangles are all $Y_D$; n is an integer greater than 1;

the mesh hole of the any mesh is in a rectangle shape, a length and a width of the mesh hole are X and Y, respectively, and the following relationship is met:

$$a < \frac{X_D \times Y_D}{X \times Y} < b,$$

where $X_D=X1+X2+\ldots+Xn$; $0.05<a<0.2$; $0.1<b<0.3$; and $a<b$.

5. The touch structure according to claim 1, wherein
the dummy electrode and the first connection portion comprise at least one second metal line, respectively;
the first connection portion comprises at least one first connection line; and
each first connection line comprises at least one second metal line, and
the first connection line is electrically connected with the two adjacent first electrode main body portions through a via hole in the insulating layer.

6. The touch structure according to claim 5, wherein each first connection line overlaps with a first metal line, with a same extension direction as the first connection line, in the second connection portion in the direction perpendicular to the first conductive layer, respectively.

7. The touch structure according to claim 5, wherein the first connection portion comprises a plurality of first connection lines, and the dummy electrode is located between any two of the plurality of first connection lines.

8. The touch structure according to claim 5, wherein each of at least one second metal line in the dummy electrode overlaps with a first metal line, with a same extension direction as the second metal line, in the second connection portion in the direction perpendicular to the first conductive layer, respectively.

9. The touch structure according to claim 8, wherein the first metal line overlapping with the dummy electrode in the second connection portion is insulated from a first metal line in an adjacent first electrode main body portion through a gap, and the dummy electrode further covers the gap and overlaps with the first metal line in the adjacent first electrode main body portion in the direction perpendicular to the first conductive layer.

10. The touch structure according to claim 5, wherein the touch structure comprises a plurality of dummy electrodes,
the first connection portion comprises a plurality of first connection lines extending along the first direction; and
the plurality of dummy electrodes and the plurality of first connection lines are alternately arranged in the second direction.

11. The touch structure according to claim 5, wherein the dummy electrode includes a plurality of second metal lines connected with each other; the plurality of second metal lines are located on a same straight line; and the plurality of second metal lines are extended along a third direction, respectively, the dummy electrode further comprises a branch portion extending from a joint of two adjacent second metal lines along a fourth direction, the branch portion overlaps with a first metal line extending along the fourth direction in the second connection portion in the direction perpendicular to the first conductive layer, and the fourth direction is different from the third direction.

12. The touch structure according to claim 5, wherein the dummy electrode comprises a plurality of second metal lines connected with each other; and two adjacent second metal lines in the plurality of second metal lines are located on different straight lines, respectively.

13. The touch structure according to claim 5, wherein the dummy electrode comprises a plurality of second metal lines connected with each other;

each of the plurality of second metal lines corresponds to one first metal mesh in the second connection portion, respectively, and the second metal line overlaps with a first metal line, with a same extension direction as the second metal line, in the corresponding first metal mesh; and an area of a mesh hole of any first metal mesh corresponding to the plurality of second metal lines of the dummy electrode is S2, and a following relationship is met:

$$a < \frac{S1}{S2} < b,$$

where $0.05<a<0.2$; $0.1<b<0.3$; and $a<b$.

14. The touch structure according to claim 1, wherein the touch structure comprises a bendable region, the first connection portion comprises a bending portion located in the bendable region, the bending portion comprises at least one second metal line, the at least one second metal line is provided with a hole, and a hole diameter of the hole is 25% to 90% of a line width of the second metal line.

15. The touch structure according to claim 14, wherein the first connection portion comprises a polygon formed by connecting a plurality of second metal lines, at least part of the polygon is used as the bending portion, and the plurality of second metal lines overlap with the plurality of first metal lines in the direction perpendicular to the first conductive layer, respectively.

16. The touch structure according to claim 15, wherein the first connection portion further comprises a plurality of second metal meshes connected with a plurality of vertexes of the polygon, respectively, and the plurality of second metal meshes overlap with a plurality of first metal meshes in the second connection portion in the direction perpendicular to the first conductive layer; and
a via hole is provided in the insulating layer corresponding to a vertex of each of the plurality of second metal meshes, and a second metal line in the second metal mesh is electrically connected with a first electrode main body portion adjacent to the first connection portion through the via hole.

17. A touch display panel, comprising:
a base substrate,
a display structure; and
the touch structure according to claim 1, wherein the display structure and the touch structure are stacked on the base substrate.

18. The touch display panel according to claim 17, wherein the display structure comprises a pixel definition layer and a plurality of sub-pixels arranged in an array,
each of the plurality of sub-pixels comprises a light emitting element and a pixel circuit for driving the light emitting element, the light emitting element comprises a first electrode, a light emitting layer and a second electrode, the light emitting layer is located between the first electrode and the second electrode, and the first electrode is located on one side of the second electrode close to the base substrate;
the pixel definition layer comprises an opening for exposing the first electrode of the light emitting element so as to define a pixel opening region of the sub-pixel; and
orthographic projections of the plurality of first metal lines and the plurality of second metal lines on the base substrate are all located outside orthographic projections of a plurality of pixel opening regions of the plurality of sub-pixels on the base substrate.

19. The touch display panel according to claim 18, wherein an orthographic projection of a mesh hole of each of the plurality of first metal meshes on the base substrate covers orthographic projection of at least one pixel opening region on the base substrate.

20. The touch display panel according to claim 18, wherein the pixel circuit comprises a storage capacitor, and the dummy electrode at least partially overlaps with at least one storage electrode of the storage capacitor.

21. The touch display panel according to claim 20, wherein the first electrode of the light emitting element is electrically connected with the pixel circuit, and the dummy electrode, the first electrode of the light emitting element and the storage electrode overlap with each other in a direction perpendicular to the base substrate.

22. The touch display panel according to claim 18, wherein the display structure further comprises a spacer disposed on one side of the pixel definition layer away from the base substrate, and
the dummy electrode and the spacer at least partially overlap in a direction perpendicular to the base substrate.

23. The touch display panel according to claim 18, wherein the dummy electrode is insulated from the first connection portion through a spacing on the second metal line,
the spacing separates the second metal line into a first portion and a second portion, the first portion belongs to the dummy electrode, and the second portion belongs to the first connection portion; and
an average length $X_D$ of the second metal line, an average width $Y_D$ of the second metal line, a size $X_{DGap}$ of the spacing and a space $S_{Gap}$ between adjacent pixel opening regions meet:

$$0 < \frac{Y_D}{S_{Gap}} < 0.2; 0.1 < \frac{X_{DGap}}{X} < 0.5.$$

24. The touch display panel according to claim 18, wherein each of the plurality of first electrode main body portions is insulated from an adjacent second touch electrode through a spacing on the first metal line,
the spacing separates the first metal line into a first portion and a second portion, the first portion belongs to the first electrode main body portion, and the second portion belongs to the second touch electrode; and
an average length $X_D$ of the first metal line, an average width $Y_D$ of the first metal line, a size $X_{DGap}$ of the spacing and a space $S_{Gap}$ between adjacent pixel opening regions meet:

$$0 < \frac{Y_D}{S_{Gap}} < 0.2; 0.1 < \frac{X_{DGap}}{X} < 0.5.$$

25. The touch display panel according to claim 18, wherein the plurality of sub-pixels comprise a first sub-pixel, the first sub-pixel is configured to emit light of a first-color; an area of an orthographic projection of the light emitting layer of the light emitting element of the first sub-pixel on the base substrate is S3; and
an orthographic projection of a pixel opening region of the first sub-pixel on the base substrate is located within an orthographic projection of a mesh hole of one of the plurality of first metal meshes on the base substrate, and an area of the mesh hole of the one first metal mesh is S4.

26. The touch display panel according to claim 25, wherein when the first sub-pixel is a green sub-pixel or a red sub-pixel, $$0 < \frac{s4}{s3} < 0.8;$$

and
when the first sub-pixel is a blue sub-pixel, $$0.9 < \frac{S4}{S3} < 1.$$

27. The touch display panel according to claim 26, wherein the orthographic projection of the light emitting layer of the light emitting element of the first sub-pixel on the base substrate is in a rectangle shape with a length $X_{FMM}$ and a width $Y_{FMM}$;
the mesh hole of the one first metal mesh has a length X and a width Y;
when the first sub-pixel is a green sub-pixel or a red sub-pixel, following relationships are met:

$$0 < \frac{X}{X_{FMM}} < 0.9; \text{ and } 0 < \frac{X \times Y}{X_{FMM} \times Y_{FMM}} < 0.8;$$

and
when the first sub-pixel is a blue sub-pixel, following relationships are met:

$$0.95 < \frac{X}{X_{FMM}} < 1; \text{ and } 0.9 < \frac{X \times Y}{X_{FMM} \times Y_{FMM}} < 1.$$

28. The touch display panel according to claim 18, wherein the first electrode of the light emitting element comprises a main body portion and an extension portion,
the main body portion overlaps with a pixel opening region of a sub-pixel to which the light emitting element belongs in a direction perpendicular to the base substrate, the extension portion does not overlap with the pixel opening region of the sub-pixel in the direction perpendicular to the base substrate, and the extension portion is electrically connected with the pixel circuit of the sub-pixel.

29. The touch display panel according to claim 28, wherein the plurality of sub-pixels comprise a first sub-pixel, a second sub-pixel and a third sub-pixel, and the first sub-pixel, the second sub-pixel and the third sub-pixel are configured to emit different colors of light; and
areas of pixel opening regions of the first sub-pixel, the second sub-pixel and the third sub-pixel are sequentially reduced.

30. The touch display panel according to claim 29, wherein
the extension portion of the first electrode of the light emitting element of the first sub-pixel overlaps with the first conductive layer in the direction perpendicular to the base substrate, and has a first overlapping area;
the extension portion of the first electrode of the light emitting element of the second sub-pixel overlaps with the first conductive layer in the direction perpendicular to the base substrate and has a second overlapping area;
the extension portion of the first electrode of the light emitting element of the third sub-pixel overlaps with the first conductive layer in the direction perpendicular to the base substrate and has a third overlapping area; and
the third overlapping area is greater than at least one of the first overlapping area and the second overlapping area.

31. An electronic apparatus, comprising the touch structure according to claim 1.

* * * * *